US012455828B2

(12) United States Patent
Akavaram et al.

(10) Patent No.: US 12,455,828 B2
(45) Date of Patent: Oct. 28, 2025

(54) HOST MANAGEMENT OF FLASH MEMORY WITH SHARED WRITE BUFFER

(71) Applicant: QUALCOMM Incorporated, San Diego, CA (US)

(72) Inventors: Santhosh Reddy Akavaram, Hyderabad (IN); Chintalapati Bharath Sai Varma, Hyderabad (IN); Prakhar Srivastava, Lucknow (IN); Hung Vuong, Coronado, CA (US); Ravi Kumar Sepuri, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 18/472,642

(22) Filed: Sep. 22, 2023

(65) Prior Publication Data

US 2025/0103499 A1    Mar. 27, 2025

(51) Int. Cl.
*G06F 12/00*     (2006.01)
*G06F 12/02*     (2006.01)
*G06F 12/084*    (2016.01)

(52) U.S. Cl.
CPC ........ *G06F 12/084* (2013.01); *G06F 12/0246* (2013.01); *G06F 2212/1032* (2013.01); *G06F 2212/2022* (2013.01); *G06F 2212/601* (2013.01)

(58) Field of Classification Search
CPC .... G06F 12/02; G06F 12/084; G06F 12/0246; G06F 2212/1032; G06F 2212/2022; G06F 2212/601
See application file for complete search history.

(56) References Cited

U.S. PATENT DOCUMENTS

| 2014/0215129 | A1* | 7/2014 | Kuzmin | G06F 12/0246 711/103 |
|---|---|---|---|---|
| 2016/0313921 | A1 | 10/2016 | Kojima | |
| 2020/0073795 | A1 | 3/2020 | Asano | |
| 2021/0294654 | A1 | 9/2021 | Boenapalli et al. | |

OTHER PUBLICATIONS

International Search Report and Written Opinion—PCT/US2024/039798—ISA/EPO—Nov. 14, 2024.
JEDEC: "Universal Flash Storage (UFS) Version 4.0", JESD220F (Revision of JESD220E, Jan. 2020), JEDEC Solid State Technology Association, Aug. 2022, 489 Pages.

* cited by examiner

*Primary Examiner* — Shawn X Gu
(74) *Attorney, Agent, or Firm* — Moore IP

(57) ABSTRACT

A host device includes a host controller interface (HCI) configured to be coupled to a flash memory device and configured to receive a notification from the flash memory device that a performance threshold register value has been exceeded while the flash memory device is configured to use a shared write buffer. The HCI is also configured to, in response to receiving the notification, perform a remedial action that includes reassigning a portion of a first logical unit (LU).

26 Claims, 12 Drawing Sheets

HOST MANAGEMENT OF FLASH MEMORY WITH SHARED WRITE BUFFER

I. FIELD

The present disclosure is generally related to host management of a flash memory device with a shared write buffer.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to operate as a host device that can store and retrieve data from a flash memory device. For example, the host device can store audio, an image, a video, a document, etc. on the flash memory device. The flash memory device can use a shared write buffer as a temporary storage area for incoming data writes from the host device before the data is written to main memory cells. Using the shared write buffer has various advantages, such as reducing write latency perceived by the host device. However, the shared write buffer can be unavailable if memory cells of the shared write buffer are reassigned for use as main memory cells or the memory cells of the shared write buffer are worn out.

III. SUMMARY

According to one implementation of the present disclosure, a host device includes a host controller interface (HCI) configured to be coupled to a flash memory device and configured to receive a notification from the flash memory device that a performance threshold register value has been exceeded while the flash memory device is configured to use a shared write buffer. The HCI is also configured to, in response to receiving the notification, perform a remedial action that includes reassigning a portion of a first logical unit (LU).

According to another implementation of the present disclosure, a method includes receiving, at a host controller interface (HCI) from a flash memory device, a notification that a performance threshold register value has been exceeded while the flash memory device is configured to use a shared write buffer. The method also includes, in response to receiving the notification, performing a remedial action that includes reassigning a portion of a first logical unit (LU).

According to another implementation of the present disclosure, a non-transitory computer-readable medium is configured to store instructions that, when executed by one or more processors, cause the one or more processors to receive, at a host controller interface (HCI) from a flash memory device, a notification that a performance threshold register value has been exceeded while the flash memory device is configured to use a shared write buffer. The instruction further cause the one or more processors to, in response to receiving the notification, perform a remedial action that includes reassigning a portion of a first logical unit (LU).

According to another implementation of the present disclosure, an apparatus includes means for receiving, at a host controller interface (HCI) from a flash memory device, a notification that a performance threshold register value has been exceeded while the flash memory device is configured to use a shared write buffer. The apparatus also includes means for performing a remedial action that includes reassigning a portion of a first logical unit (LU), the remedial action performed in response to receiving the notification.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
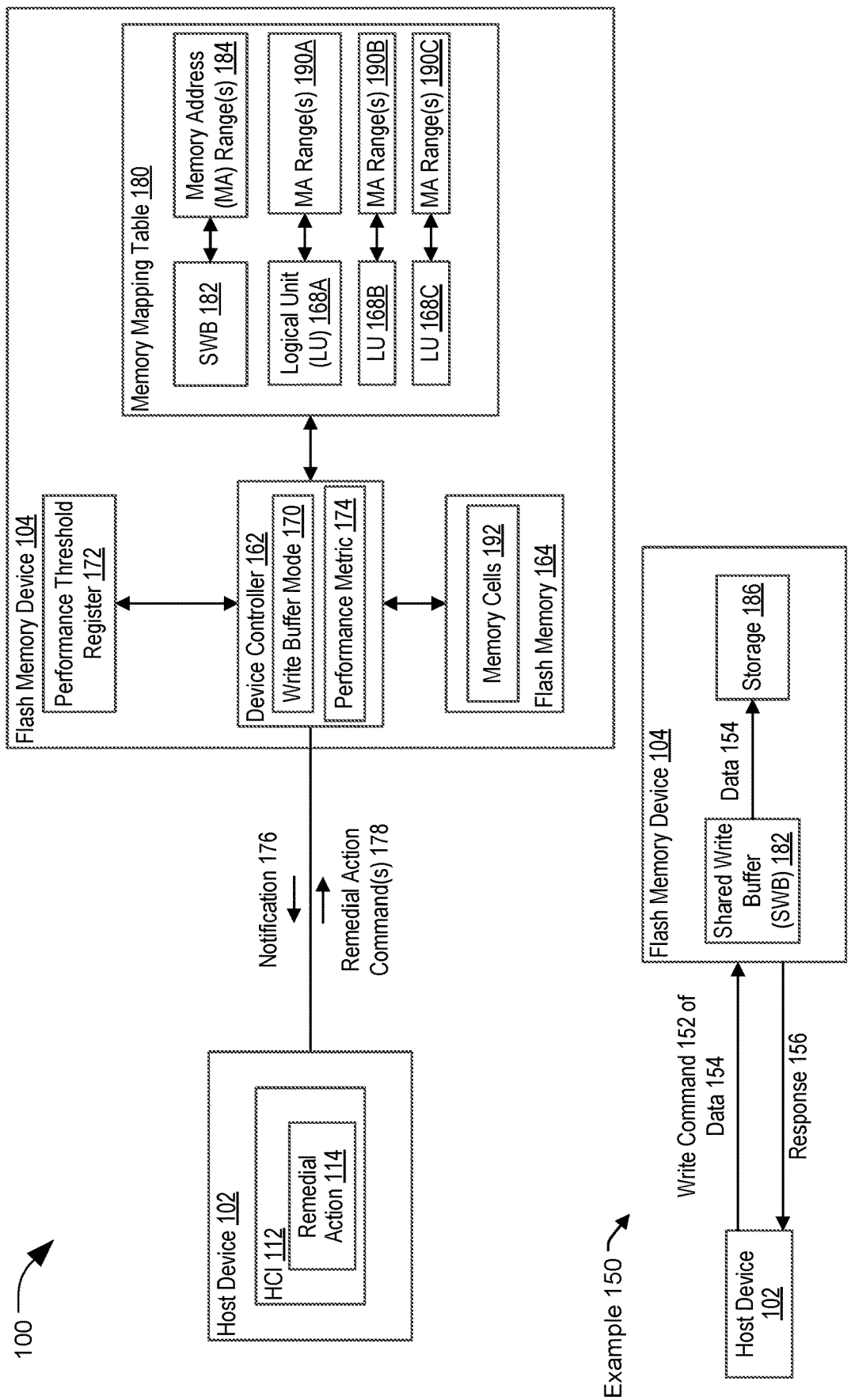
FIG. 1 is a block diagram of a particular illustrative aspect of a system operable to perform host management of flash memory with a shared write buffer, in accordance with some examples of the present disclosure.

Computing devices often incorporate functionality to store and retrieve data from a flash memory device. For example, a host device can store audio, an image, a video, a document, etc. on the flash memory device. The flash memory device includes main memory cells of a first memory type (e.g., triple-level cell (TLC)) that are used to store the data. The flash memory device can also include a shared write buffer with memory cells of a second memory type (e.g., single-level cell (SLC)). In some examples, memory cells of the first memory type can store more data whereas writing to memory cells of the second memory type is faster, so memory cells of the first memory type are used as main memory cells to increase storage capacity and memory cells of the second memory type are used as the shared write buffer to reduce write latency.

The main memory is divided into logical units for various purposes, such as wear leveling and managing different types of memory usage. Typically, the shared write buffer can become unavailable for different reasons. For example, if capacity used of a logical unit reaches a capacity threshold, the shared write buffer is disabled and the memory cells of the shared write buffer are reassigned to the logical unit. As another example, the shared write buffer can be unavailable if memory cells assigned to the shared write buffer wear out.

Systems and methods of performing host management of flash memory with a shared write buffer are disclosed. The flash memory device maintains performance metrics of memory cells. For example, the flash memory device maintains utilization metrics of logical units, an endurance metric of the shared write buffer, or both. The performance metrics can include a count of writes, a program cycle time, an available storage capacity, or a combination thereof.

The flash memory device sends a notification to the host device in response to detecting that a performance metric exceeds a performance threshold, and the host device performs one or more remedial actions in response to receiving the notification. For example, the host device, in response to receiving a notification that utilization of a particular logical unit has exceeded a capacity threshold, selects a least utilized logical unit and sends a command to the flash memory device to reassign a portion of the least utilized logical unit to the particular logical unit. In another example, the host device, in response to receiving the notification that the utilization of the particular logical unit has exceeded the capacity threshold, sends one or more commands to the flash memory device to reassign memory cells of the shared write buffer to the particular logical unit and to reassign the portion of the least utilized logical unit to the shared write buffer. In both of the above examples, reassigning the portion of the least utilized logical unit provides the technical advantage of enabling the shared write buffer to remain available after detecting that another logical unit was getting full.

In another example, the host device, in response to receiving a notification that an endurance used of the shared write buffer exceeds an endurance threshold, selects a portion of a least utilized logical unit and sends one or more commands to the flash memory device to reassign memory cells of the shared write buffer to the least utilized logical unit and to reassign the portion of the least utilized logical unit to the shared write buffer. Swapping out the memory cells of the shared write buffer with the portion of the least utilized logical unit that has a greater remaining endurance provides the technical advantage of prolonging a life span of the shared write buffer.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a memory mapping table 180 that indicates that a shared write buffer 182 corresponds to one or more memory address ranges ("memory address range(s)" 184 of FIG. 1), which indicates that in some aspects the shared write buffer 182 corresponds to single memory address range 184 (e.g., a contiguous memory range) and in other aspects the shared write buffer 182 corresponds to multiple memory address ranges 184 (e.g., non-contiguous memory ranges). For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple logical units are illustrated and associated with reference numbers 168A, 168B, and 168C. When referring to a particular one of these logical units, such as a logical unit 168A, the distinguishing letter "A" is used. However, when referring to any arbitrary one of these logical units or to these logical units as a group, the reference number 168 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to perform host management of flash memory with a shared write buffer. The system 100 includes a host device 102 that is configured to be coupled to a flash memory device 104.

The flash memory device 104 includes a device controller 162 that is coupled to a flash memory 164 (e.g., NAND memory) that includes memory cells 192. The device controller 162 has access to a memory mapping table 180. For example, the memory mapping table 180 is stored in a portion of the flash memory 164 or a static random access memory (SRAM) coupled to the device controller 162. In some implementations, the memory mapping table 180 corresponds to a logical-to-physical address mapping table.

The memory mapping table 180 is configured to indicate memory cells of the flash memory 164 that are assigned to a shared write buffer 182. For example, the memory mapping table 180 indicates that the shared write buffer 182 corresponds to one or more memory address ranges 184. A particular memory address range 184 indicates a corresponding subset of the memory cells 192.

The memory mapping table 180 is also configured to indicate memory cells of the flash memory 164 that are assigned to logical units 168. For example, the memory mapping table 180 indicates that a logical unit 168A corresponds to one or more memory address ranges 190A, a logical unit 168B corresponds to one or more memory address ranges 190B, a logical unit 168C corresponds to one or more memory address ranges 190C, one or more additional logical units correspond to respective memory address range(s), or a combination thereof. Each particular memory address range 190 indicates a corresponding subset of the memory cells 192.

In a particular aspect, each of a first subset of the memory cells 192 that is assigned to the logical units 168 has a first memory type (e.g., triple-level cell (TLC)), and each of a second subset of the memory cells 192 that is assigned to the shared write buffer 182 has a second memory type (e.g., single-level cell (SLC)). In a particular aspect, memory cells of the first memory type can store more data, whereas memory cells of the second memory type correspond to lower write latency.

The device controller 162 is configured to perform write operations to the flash memory 164 in accordance with a write buffer mode 170, which indicates whether the flash memory device 104 is configured to use the shared write buffer 182. For example, when the write buffer mode 170 is enabled, the shared write buffer 182 is available and is to be used as temporary storage for data writes. In a particular aspect, the write buffer mode 170 is set based on default data, a configuration setting, a user input, a command from the HCI 112, or a combination thereof. In a particular aspect, an indicator of the write buffer mode 170 is stored in a portion of the flash memory 164, a register, or another type of data storage.

The device controller 162 is coupled to, or includes, a performance threshold register 172 that is configured to store a performance threshold. The performance threshold register 172 storing the performance threshold is provided as an illustrative example; in other examples, another type of data storage can be used to store the performance threshold. The device controller 162 is configured to determine a performance metric 174 and to generate a notification 176 based on a determination that the performance metric 174 exceeds the performance threshold (e.g., by comparing the performance metric 174 to a value of the performance threshold register 172). As described further below, the performance metric 174 can correspond to one or more aspects of operation associated with the write buffer mode 170, such as an endurance estimate of the shared write buffer 182 or an amount of usage of one or more logical units 168 that may impact the shared write buffer 182, as illustrative, non-limiting examples.

The host device 102 includes a host controller interface (HCI) 112 that is configured to be coupled to the flash memory device 104. In an example, the HCI 112 is configured to communicate with the device controller 162 of the flash memory device 104. The HCI 112 is configured to perform a remedial action 114 responsive to receiving the notification 176. The remedial action 114 can include sending one or more remedial action commands 178 to the device controller 162. According to some implementations, the HCI 112 is configured to send one or more commands to the device controller 162, and the device controller 162 is configured to send a response to a command received from the HCI 112.

In a particular implementation, the device controller 162 is configured to send the notification 176 further based on determining that the write buffer mode 170 is enabled. In this implementation, the device controller 162 refrains from sending the notification 176 while the write buffer mode 170 is disabled. In some aspects, the device controller 162, in response to detecting a transition of the write buffer mode 170 from disabled to enabled, performs a comparison of the performance metric 174 and the value of the performance threshold register 172 and generates the notification 176 based on the performance metric 174 exceeding the value of the performance threshold register 172.

In a particular implementation, the HCI 112 performs the remedial action 114 further based on determining that the write buffer mode 170 is enabled at the flash memory device 104. In this implementation, the HCI 112 refrains from performing the remedial action 114 while the write buffer mode 170 is disabled. In some aspects, the HCI 112 performs the remedial action 114 in response to detecting a transition of the write buffer mode 170 from disabled to enabled and determining that the remedial action 114 has not been performed for a notification 176 that was received previously. For example, the device controller 162 sends the notification 176 while the write buffer mode 170 is enabled, the write buffer mode 170 transitions from enabled to disabled prior to the HCI 112 performing the remedial action 114, and subsequently the write buffer mode 170 transitions from disabled to enabled. In this example, the HCI 112 retains the notification 176 as a pending notification while a corresponding remedial action 114 is not performed, and performs the remedial action 114 responsive to determining that the write buffer mode 170 has transitioned from disabled to enabled and that the notification 176 is pending.

During operation, the device controller 162 updates the performance metric 174 and determines whether the performance metric 174 exceeds a performance threshold (e.g., a value of the performance threshold register 172), as further described with reference to FIGS. 2 and 5A. In some implementations, the device controller 162 performs the comparison of the performance metric 174 and the value of the performance threshold register 172 based on determining that the write buffer mode 170 is enabled.

An example 150 depicts a write operation using the shared write buffer 182. The host device 102 (e.g., the HCI 112) sends a write command 152 indicating data 154 to the flash memory device 104. In a particular aspect, the write command 152 indicates that the data 154 is to be stored at a particular memory location of the logical unit 168B. The flash memory device 104 (e.g., the device controller 162), in response to determining that the write buffer mode 170 is enabled, stores the data 154 in the shared write buffer 182 and sends a response 156 to the host device 102 indicating that the write is successful. In some implementations, the performance metric 174 corresponds to an endurance used of the shared write buffer 182 (e.g., an estimated reduction of cell endurance, or increase in the percentage of estimated lifetime that has been used, based on write/erase cycles), and the device controller 162 updates the performance metric 174 responsive to storing the data 154 in the shared write buffer 182, as further described with reference to FIG. 5A. Writing to the shared write buffer 182 can be faster than writing to the logical unit 168B, thereby reducing a latency between the host device 102 sending the data 154 to the flash memory device 104 and receiving the response 156.

At a later time, the flash memory device 104 (e.g., the device controller 162) stores the data 154 to storage 186. For example, the storage 186 includes the logical units 168, and the flash memory device 104 writes the data 154 from the shared write buffer 182 to the particular memory location of the logical unit 168B. In a particular aspect, the flash memory device 104 writes the data 154 to the logical unit 168B as part of performing a flush of data from the shared write buffer 182 to the storage 186.

In some implementations, the performance metric 174 corresponds to logical unit capacity used of the logical units 168, and the device controller 162 updates the performance metric 174 (e.g., capacity used of the logical unit 168B) responsive to storing the data 154 in the logical unit 168B, as further described with reference to FIG. 2.

The device controller 162, in response to determining that the performance metric 174 is updated, determines whether the performance metric 174 exceeds the value of the performance threshold register 172, as further described with reference to FIGS. 2, 3B, 5A, and 5C. The device controller 162 generates a notification 176 in response to determining that the performance metric 174 exceeds the value of the performance threshold register 172, as further described with reference to FIGS. 2, 3B, 5A, and 5C, and sends the notification 176 to the host device 102. In some implementations, the device controller 162 performs the comparison of the performance metric 174 to the value of the performance threshold register 172, generates the notification 176, sends the notification 176 to the host device 102, or a combination thereof, based on determining that the write buffer mode 170 is enabled.

The HCI 112 receives the notification 176 from the flash memory device 104 indicating that the value of the performance threshold register 172 has been exceeded while the write buffer mode 170 is enabled (e.g., indicating the flash memory device 104 is configured to use the shared write buffer 182). The HCI 112, in response to receiving the notification 176, performs a remedial action 114 that includes reassigning a portion of the logical unit 168A, as further described with reference to FIGS. 2-5D. The remedial action 114 includes sending one or more remedial action commands 178 to the device controller 162 to initiate one or more operations at the device controller 162. In some implementations, the HCI 112 performs the remedial action 114 based on a determination that the write buffer mode 170 is enabled.

In a particular example, the notification 176 indicates that a capacity used of the logical unit 168B exceeded a capacity threshold indicated by a value of the performance threshold register 172 when the write buffer mode 170 is enabled. The HCI 112, in response to receiving the notification 176, identifies the logical unit 168A as a least utilized logical unit of the logical units 168, as further described with reference to FIG. 2. In some implementations, the one or more remedial action commands 178 indicate that a portion of the logical unit 168A is to be reassigned to the logical unit 168B, as further described with reference to FIGS. 2-3B. In alternative implementations, the one or more remedial action commands 178 indicate that the portion of the logical unit 168A is to be reassigned to the shared write buffer 182 and that the memory address range(s) 184 of the shared write buffer 182 are to be reassigned to the logical unit 168B, as further described with reference to FIGS. 2 and 4A-4B. The device controller 162 performs the operations indicated in the one or more remedial action commands 178.

In another particular example, the notification 176 indicates that an endurance used of the shared write buffer 182 exceeded an endurance threshold indicated by a value of the performance threshold register 172 when the write buffer mode 170 is enabled. The HCI 112, in response to receiving the notification 176, identifies the logical unit 168A as a least utilized logical unit of the logical units 168 and generates the one or more remedial action commands 178 indicating that a portion of the logical unit 168A is to be reassigned to the shared write buffer 182 and that the memory address range(s) 184 of the shared write buffer 182 are to be reassigned to the logical unit 168A (or to another logical unit), as further described with reference to FIGS. 5A-5D. The device controller 162 performs the operations indicated in the one or more remedial action commands 178.

A technical advantage of performing the remedial action 114 includes enabling the shared write buffer 182 to remain in use subsequent to a logical unit 168 getting full or the memory cells assigned to the shared write buffer 182 getting worn out. In an example, a portion of the logical unit 168A is assigned to the logical unit 168B that is getting full so that the shared write buffer 182 does not have to be reassigned to the logical unit 168B. In another example, a portion of the logical unit 168A is assigned to the shared write buffer 182 so that the shared write buffer 182 can remain available when memory of the shared write buffer 182 is reassigned to the logical unit 168B that is getting full or when memory of the shared write buffer 182 is getting worn out.

It should be understood that the particular order of operations in the above example(s), or in other examples described herein, is provided for purposes of illustration and not of limitation. In other examples, two or more operations can be performed in another order. To illustrate, in some examples, the one or more remedial action commands 178 can indicate that the portion of the logical unit 168A is to be reassigned to the shared write buffer 182 prior to reassigning the memory address range(s) 184 of the shared write buffer 182 to the logical unit 168B that is getting full. In other examples, the one or more remedial action commands 178 can indicate that the memory address range(s) 184 of the shared write buffer 182 are to be reassigned to the logical unit 168B prior to reassigning the portion of the logical unit 168A to the shared write buffer 182.

Figure 2:
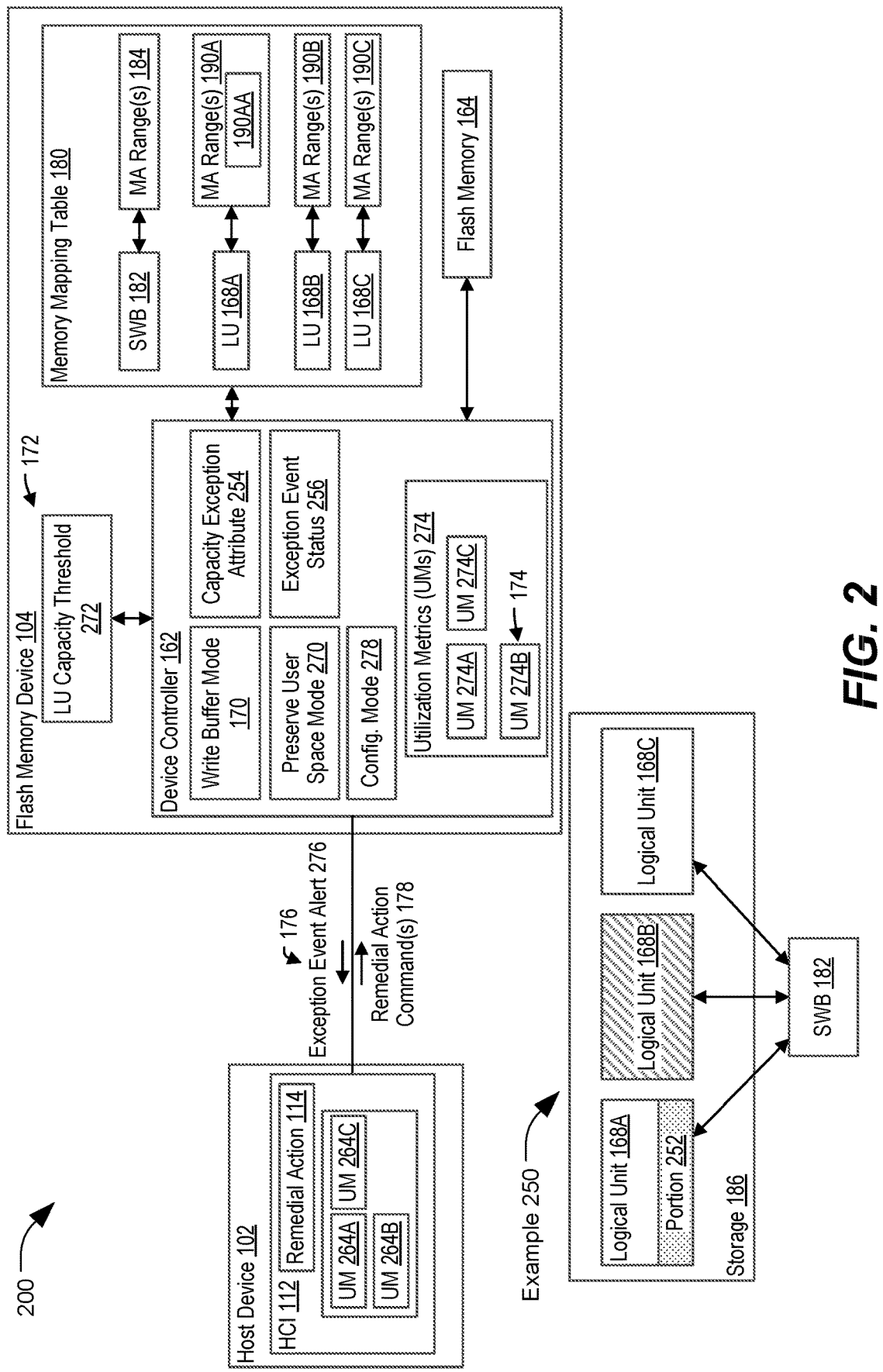
FIG. 2 is a diagram of a particular illustrative aspect of the system of FIG. 1, in accordance with some examples of the present disclosure.

Referring to FIG. 2, a particular illustrative aspect is shown of a system 200 that is configured to perform host management of flash memory with a shared write buffer. In a particular aspect, the system 100 of FIG. 1 includes one or more components of the system 200.

In FIG. 2, the device controller 162 is configured to maintain utilization metrics 274 of the logical units 168. For example, the device controller 162 maintains a utilization metric 274A, a utilization metric 274B, and a utilization metric 274C of the logical unit 168A, the logical unit 168B, and the logical unit 168C, respectively. The utilization metrics 274 corresponding to three logical units is provided as an illustrative example; in other examples, the utilization metrics 274 can correspond to fewer than three or more than three logical units. In some implementations, the utilization metrics 274 are stored as a utilization array. In some aspects, a utilization metric 274 of a logical unit 168 is related to the storage capacity of the logical unit 168, such as an indication of a used storage capacity of the logical unit 168 or an available storage capacity of the logical unit 168. Alternatively, or in addition, the utilization metric 274 of a logical unit 168 is related to the endurance of the memory cells associated with the logical unit, such as an indication of a program cycle time of the logical unit 168, a count of write commands to the logical unit 168, or a combination thereof, as further described with reference to FIG. 5A.

The device controller 162 has access to indicators or settings associated with one or more configuration modes, e.g., the write buffer mode 170, a capacity exception attribute 254, a preserve user space mode 270, a configuration mode 278, one or more additional configuration modes, or a combination thereof. The configuration mode(s) are based on default data, a configuration setting, a user input, a command from the host device 102, or a combination thereof. For example, in a particular implementation, the HCI 112 sends a command to the flash memory device 104 to set (e.g., enable) the capacity exception attribute 254 (e.g., an exception event control attribute) to activate alert generation corresponding to logical unit capacity. The device controller 162 is configured to, when the capacity exception attribute 254 is enabled, generate an exception event alert 276 in response to determining that an exception event status 256 indicates that a utilization metric 274 has exceeded a logical unit capacity threshold 272.

In some implementations, the logical unit capacity threshold 272 indicates a storage capacity threshold (e.g., a threshold percentage), and a utilization metric 274 of a logical unit 168 indicates a used storage capacity (e.g., a percentage of storage capacity that is used) of the logical unit 168. The device controller 162 increases the used storage capacity indicated by the utilization metric 274 based on a data write to the logical unit 168 (e.g., a data write to previously unused memory cells of the logical unit 168). The device controller 162 also increases the used storage capacity indicated by the utilization metric 274 based on removal of a portion of the logical unit 168 (e.g., because of reassignment of the portion to another logical unit or to the shared write buffer 182). The device controller 162 reduces the used storage capacity indicated by the utilization metric 274 based on a data erase at the logical unit 168 (e.g., an erase of one or more memory cells of the logical unit 168). The device controller 162 also reduces the used storage capacity indicated by the utilization metric 274 based on addition of a portion to the logical unit 168 (e.g., because of reassignment of the portion from another logical unit or from the shared write buffer 182). In a particular aspect, the used storage capacity exceeding the storage capacity threshold indicates that the logical unit 168 is getting full.

In some implementations, the logical unit capacity threshold 272 is stored in a performance threshold register 172. In other implementations, another type of data storage (e.g., a portion of the flash memory 164) is used to store the logical unit capacity threshold 272. In some aspects, data storage of a particular size (e.g., 1 byte) is used to store the logical unit capacity threshold 272. In some implementations, a first value (e.g., 00 in hexadecimal) of the logical unit capacity threshold 272 indicates that comparisons to the logical unit capacity threshold 272 are disabled. A second value of the logical unit capacity threshold 272 within a range (e.g., 01 to 09 in hexadecimal) indicates a corresponding used storage capacity threshold value (e.g., 10 percent to 90 percent). A third value (e.g., 0 A in hexadecimal) of the logical unit capacity threshold 272 indicates a corresponding used storage capacity threshold value (e.g., 100 percent).

In some implementations, the same logical unit capacity threshold 272 is used for comparison with each of the utilization metrics 274 of the logical units 168. In alternative implementations, a first logical unit capacity threshold 272 can be used for comparison with the utilization metric 274A of a logical unit 168A and a second logical unit capacity threshold 272 can be used for comparison with the utilization metric 274B with a logical unit 168B. To illustrate, the device controller 162 can assign different logical unit capacity thresholds 272 for different logical units 168 based on various criteria, such as type of data stored at the logical units.

The logical unit capacity threshold 272 is based on default data, a configuration setting, a user input, a command from the host device 102, or a combination thereof. For example, in a particular implementation, the HCI 112 sends a command to the flash memory device 104 to set the logical unit capacity threshold 272 to a particular value.

In a particular aspect, the device controller 162 is configured to update the exception event status 256 in response to an update to the utilization metrics 274. For example, the device controller 162 is configured to, in response to determining that the utilization metric 274B is greater than the logical unit capacity threshold 272, update the exception event status 256 (e.g., set a particular exception event status attribute) to indicate that the logical unit capacity threshold 272 is exceeded by the logical unit 168B.

In some implementations, the preserve user space mode 270 is enabled to indicate that a portion of the least utilized logical unit is to be reassigned to a logical unit that is getting full, as further described with reference to FIGS. 3A-3B. In alternative implementations, the preserve user space mode 270 is enabled to indicate that, when a particular logical unit is getting full, memory cells of the shared write buffer 182 are to be reassigned to the particular logical unit and a portion of the least utilized logical unit is to be reassigned to the shared write buffer 182, as further described with reference to FIGS. 4A-4B.

In some implementations, the configuration mode 278 enables the device controller 162 to selectively reassign the portion of the least utilized logical unit to either the logical unit that is getting full or to the shared write buffer 182 when the preserve user space mode 270 is enabled. For example, the configuration mode 278 is enabled to indicate that, when the preserve user space mode 270 is enabled, the portion of the least utilized logical unit is to be reassigned to a logical unit that is getting full, as described with reference to FIGS. 3A-3B. In these implementations, the configuration mode 278 is disabled to indicate that, when the preserve user space mode 270 is enabled, memory cells of the shared write buffer 182 are to be reassigned to a logical unit that is getting full, and the portion of the least utilized logical unit is to be reassigned to the shared write buffer 182, as further described with reference to FIGS. 4A-4B.

During operation, the HCI 112 sends a command to the flash memory device 104 to set the capacity exception attribute 254 to activate alert generation corresponding to logical unit (LU) capacity. In some implementations, the HCI 112 also sends a command to the flash memory device 104 to enable the preserve user space mode 270 and a command indicating whether to enable the configuration mode 278. Subsequently, the device controller 162, in response to determining that the capacity exception attribute 254 indicates that the alert generation is activated and that the exception event status 256 indicates that the logical unit capacity threshold 272 is exceeded by the utilization metric 274B, generates an exception event alert 276 indicating that a utilization of the logical unit 168B has exceeded the logical unit capacity threshold 272. In a particular aspect, the device controller 162 generates the exception event alert 276 further based on determining that the write buffer mode 170 is enabled and that the preserve user space mode 270 is enabled. In a particular aspect, the logical unit capacity threshold 272 corresponds to a value of the performance threshold register 172 and the exception event alert 276 corresponds to the notification 176. The device controller 162 sends the exception event alert 276 to the host device 102.

The HCI 112 performs a remedial action 114 in response to receiving the exception event alert 276 indicating that the logical unit capacity threshold 272 is exceeded by a utilization of the logical unit 168B when the write buffer mode 170 is enabled and the preserve user space mode 270 is enabled. The HCI 112 generates one or more remedial action commands 178 based on utilization metrics 264. In an example, the utilization metrics 264 include a utilization metric 264A of the logical unit 168A, a utilization metric 264B of the logical unit 168B, a utilization metric 264C of the logical unit 168C, one or more additional utilization metrics of one or more respective logical units 168, or a combination thereof.

In some implementations, the utilization metrics 264 are a copy of the utilization metrics 274 and the HCI 112 receives the utilization metrics 264 from the device controller 162 concurrently with receiving the exception event alert 276.

In some implementations, the utilization metrics 264 are generated and maintained by the HCI 112. For example, the HCI 112 maintains the utilization metrics 264 as a utilization array that indicates parameters, such as write frequency, command queue entries, etc., that are detectable at the host device 102. In a particular aspect, the write frequency is based on a count of write commands for a logical unit 168 sent by the HCI 112 to the flash memory device 104 over time. In a particular aspect, the command queue entries indicate a count of write commands for a logical unit 168 that are queued to be sent to the flash memory device 104.

The utilization metrics 264 indicate used storage capacity of the logical units 168. For example, the HCI 112 can increase or decrease the storage used that is indicated by the utilization metric 264A based on sending an erase command or a write command for the logical unit 168A to the flash memory device 104. As another example, the HCI 112 can increase or decrease the storage used that is indicated by the utilization metric 264A, such as based on a write command for the logical unit 168A that is queued for sending to the flash memory device 104.

The HCI 112 increases the used storage capacity indicated by the utilization metric 264 based on removal of a portion of the logical unit 168 (e.g., because of reassignment of the portion to another logical unit or to the shared write buffer 182). The HCI 112 reduces the used storage capacity indicated by the utilization metric 264 based on addition of a portion to the logical unit 168 (e.g., because of reassignment of the portion from another logical unit or from the shared write buffer 182).

In some implementations, the utilization metrics 264 also indicate endurance used of the logical units 168, as further described with reference to FIG. 5A. For example, the utilization metric 264A can be based on parameters such as write frequency, a count of program cycles, a program cycle time, etc. To illustrate, the HCI 112 can increase the endurance used that is indicated by the utilization metric 264A based on counts of write commands for the logical unit 168A sent or queued to be sent to the flash memory device 104. In some implementations, the HCI 112 can update the endurance used based on a program cycle time of a logical unit 168.

The HCI 112 determines, based on the utilization metrics 264 (e.g., values of a utilization array), that the logical unit 168A corresponds to a least utilized logical unit of the logical units 168. For example, the HCI 112, in response to determining that the utilization metric 264A indicates a lowest used storage capacity (or a largest available storage capacity) among the utilization metrics 264, identifies the logical unit 168A as the least utilized logical unit. In another example, the HCI 112, in response to determining that the utilization metric 264A indicates a used storage capacity and endurance used that corresponds to a lowest combined value (e.g., a lowest weighted average) among the utilization metrics 264, identifies the logical unit 168A as the least utilized logical unit, as further described with reference to FIG. 5A.

In an example 250, the HCI 112 selects a portion 252 of the logical unit 168A (e.g., the least utilized logical unit). In a particular aspect, the portion 252 includes unused memory cells corresponding to memory address range(s) 190AA that are included in the memory address range(s) 190A of the logical unit 168A. In a particular aspect, a size of the portion 252 (e.g., a count of the unused memory cells) is based on default data, a configuration setting, a user input, an available storage capacity of the logical unit 168A, or a combination thereof. The HCI 112 performs the remedial action 114 including reassigning the portion 252, as further described with reference to FIGS. 3A-4B.

Figure 3A:
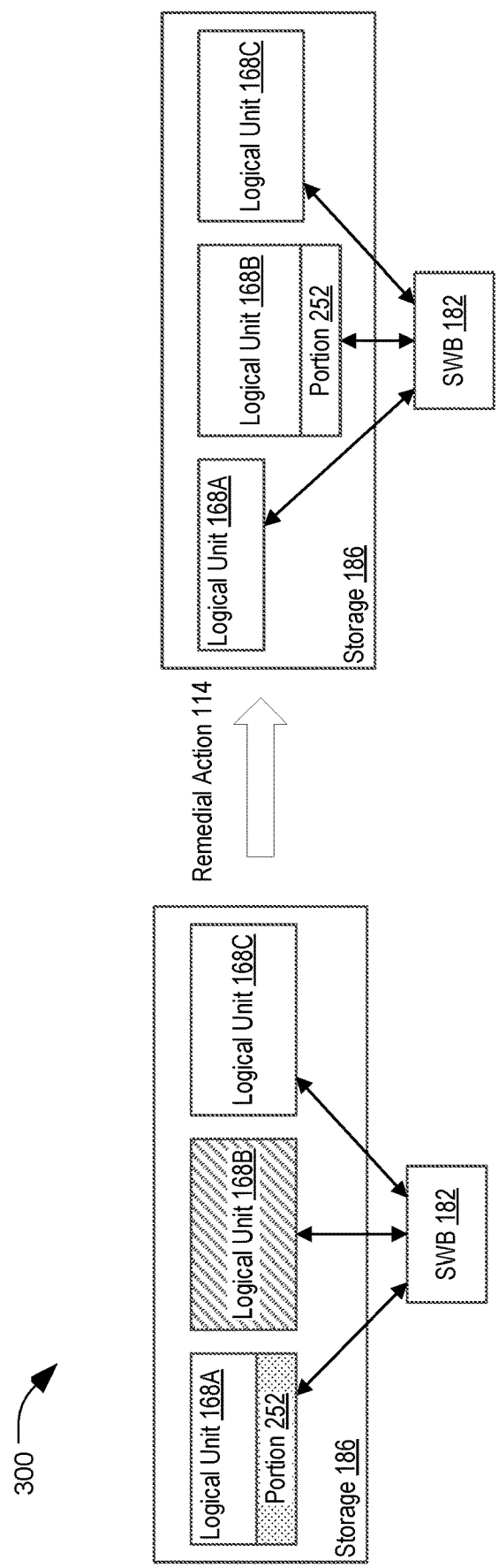
FIG. 3A is a diagram of a particular illustrative aspect of a remedial action that can be performed by the system of FIG. 2, in accordance with some examples of the present disclosure.

Referring to FIG. 3A, a diagram is shown of an example 300 of remedial actions 114 that can be performed by the system 200 of FIG. 2. The remedial actions 114 include reassigning the portion 252 to the logical unit 168B.

In an example, the HCI 112 of FIG. 2 performs the remedial action 114 including sending the one or more remedial action commands 178 to the device controller 162 to reassign the portion 252 corresponding to the memory address range(s) 190AA from the logical unit 168A to the logical unit 168B, as further described with reference to FIG. 3B. In some aspects, the HCI 112 performs the remedial actions 114 to reassign the portion 252 to the logical unit 168B based at least in part on determining that each of the write buffer mode 170, the preserve user space mode 270, and the configuration mode 278 is enabled.

In a particular aspect, the device controller 162 updates the utilization metric 274A and the utilization metric 274B based on reassigning memory cells corresponding to the memory address range(s) 190AA from the logical unit 168A to the logical unit 168B. In a particular aspect, the updated utilization metric 274B no longer exceeds (e.g., is less than or equal to) the logical unit capacity threshold 272. As a result, when the preserve user space mode 270 is enabled, a default mechanism of the system 200—e.g., making the shared write buffer 182 unavailable by reassigning memory cells of the shared write buffer 182 to a full logical unit in accordance with a universal flash storage (UFS) standard—can be circumvented by the host device 102 preventing the logical units 168 from running out of space.

Figure 3B:
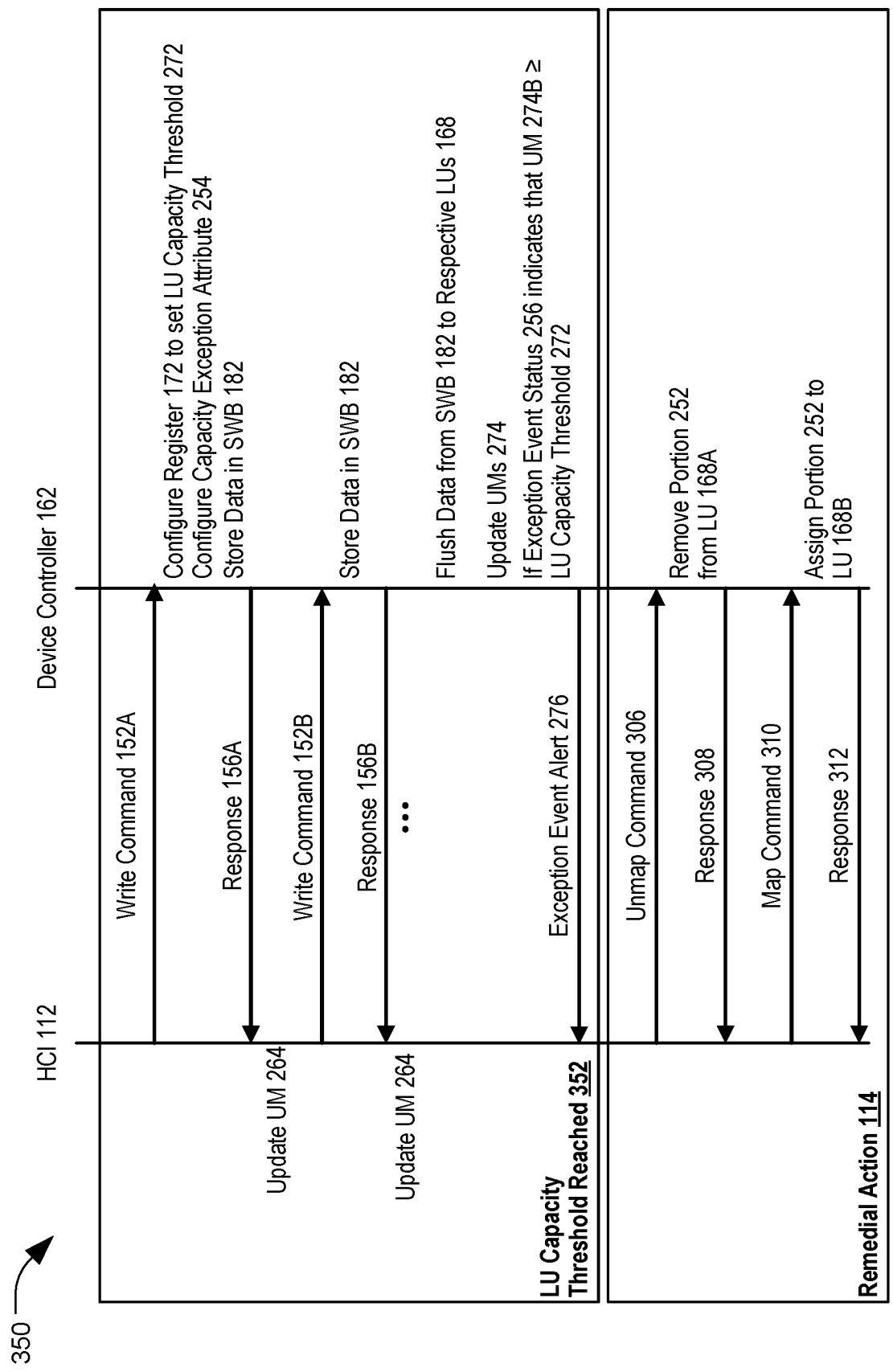
FIG. 3B is a ladder diagram of an illustrative aspect of operations associated with the remedial action of FIG. 3A, in accordance with some examples of the present disclosure.

Referring to FIG. 3B, a ladder diagram is shown of an illustrative aspect of operations 350 associated with the remedial action 114 of FIG. 3A. In a particular aspect, one or more of the operations 350 are performed by the HCI 112, the host device 102, the device controller 162, the flash memory 164, the flash memory device 104, the system 100 of FIG. 1, the system 200 of FIG. 2, or a combination thereof.

An example of operations corresponding to a LU capacity threshold reached 352 is illustrated. For example, the HCI 112 sends a write command 152A to the flash memory device 104. In some implementations, the HCI 112 updates a utilization metric 264 concurrently with sending the write command 152A to the flash memory device 104. For example, the write command 152A indicates that the data is to be written to the logical unit 168B and the HCI 112 updates the utilization metric 264B (e.g., a count of write commands, a used storage capacity, a count of program cycles, a program cycle time, or a combination thereof) of the logical unit 168B.

The device controller 162, in response to receiving the write command 152A and determining that the write buffer mode 170 is enabled, configures the performance threshold register 172 to set the logical unit capacity threshold 272 (e.g., a predetermined threshold value), configures the capacity exception attribute 254 to activate alert generation corresponding to logical unit capacity, and stores data indicated in the write command 152A to the shared write buffer 182. The device controller 162, in response to storing the data in the shared write buffer 182, sends a response 156A to the HCI 112 indicating that the data write is successful.

In a particular aspect, the HCI 112 sends one or more additional commands to the device controller 162 and receives respective responses from the device controller 162 prior to flushing data from the shared write buffer 182. For example, the HCI 112 sends a write command 152B to the device controller 162 and updates the utilization metrics 264. The device controller 162, in response to receiving the write command 152B stores data indicated in the write command 152B to the shared write buffer 182 and sends a response 156B to the HCI 112. The device controller 162 flushes data from the shared write buffer 182 to respective logical units 168 and updates the utilization metrics 274. For example, the device controller 162 writes data of the write command 152B to one or more memory cells of the logical unit 168B and updates the utilization metric 274B (e.g., a count of write commands, a used storage capacity, a count of program cycles, a program cycle time, or a combination thereof) of the logical unit 168B.

In a particular aspect, the device controller 162 updates the exception event status 256 based on a comparison of the utilization metrics 274 and the logical unit capacity threshold 272. For example, the device controller 162, in response to determining that the utilization metric 274B exceeds the logical unit capacity threshold 272, updates the exception event status 256 to indicate that utilization of the logical unit 168B exceeds the logical unit capacity threshold 272. The device controller 162, in response to determining that the exception event status 256 indicates that utilization of the logical unit 168B exceeds the logical unit capacity threshold 272, that the preserve user space mode 270 is enabled, and that the capacity exception attribute 254 indicates that alert generation is activated, sends an exception event alert 276 to the HCI 112 indicating that capacity of the logical unit 168B has exceeded the logical unit capacity threshold 272.

The HCI 112 performs the remedial action 114 in response to receiving the exception event alert 276. For example, the HCI 112 identifies the logical unit 168A as the least utilized logical unit based on the utilization metrics 264 and selects the portion 252 of the logical unit 168A, as described with reference to FIG. 2.

In some aspects, the HCI 112 selects the remedial action 114 to be performed based on determining that the preserve user space mode 270 and the configuration mode 278 are enabled. The HCI 112 sends an unmap command 306 to the flash memory device 104 to unmap the portion 252 from the logical unit 168A. The device controller 162, in response to receiving the unmap command 306, updates the memory mapping table 180 to remove the memory address range(s) 190AA of the portion 252 from the logical unit 168A. The device controller 162 sends a response 308 to the host device 102 indicating that the unmap command has been performed successfully. In a particular aspect, the device controller 162 and the HCI 112 update the utilization metric 274A and the utilization metric 264A, respectively, corresponding to removal of the memory address range(s) 190AA from the logical unit 168A, as described with reference to FIG. 2.

The HCI 112 sends a map command 310 to the flash memory device 104 to map the portion 252 to the logical unit 168B. The device controller 162, in response to receiving the map command 310, updates the memory mapping table 180 to add the memory address range(s) 190AA to the memory address range(s) 190B of the logical unit 168B and sends a response 312 to the host device 102 indicating that the map command has been performed successfully. The HCI 112 thus reassigns the portion 252 of the logical unit 168A to the logical unit 168B.

In a particular aspect, the device controller 162 and the HCI 112 update the utilization metric 274B and the utilization metric 264B, respectively, corresponding to addition of the memory address range(s) 190AA to the logical unit 168B, as described with reference to FIG. 2. In a particular aspect, the updated utilization metric 274B no longer exceeds the logical unit capacity threshold 272.

The operations 350 thus enable reassigning the portion 252 from the least utilized logical unit to the logical unit 168B that is getting full. A technical advantage of reassigning the portion 252 (instead of the shared write buffer 182) to the logical unit 168B includes enabling the shared write buffer 182 to remain in use.

Figure 4A:
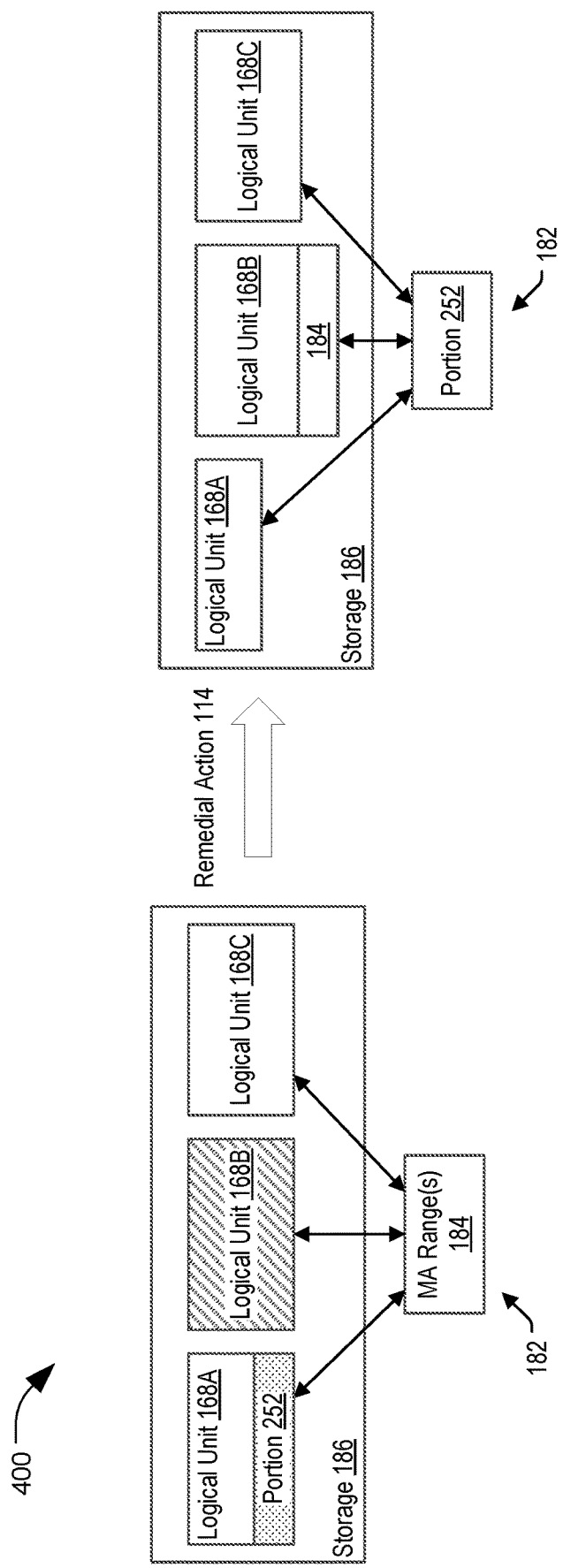
FIG. 4A is a diagram of an illustrative aspect of another remedial action that can be performed by the system of FIG. 2, in accordance with some examples of the present disclosure.

Referring to FIG. 4A, a diagram is shown of an example 400 of remedial actions 114 that can be performed by the system 200 of FIG. 2. The remedial actions 114 include reassigning the portion 252 to the shared write buffer 182.

Figure 4B:
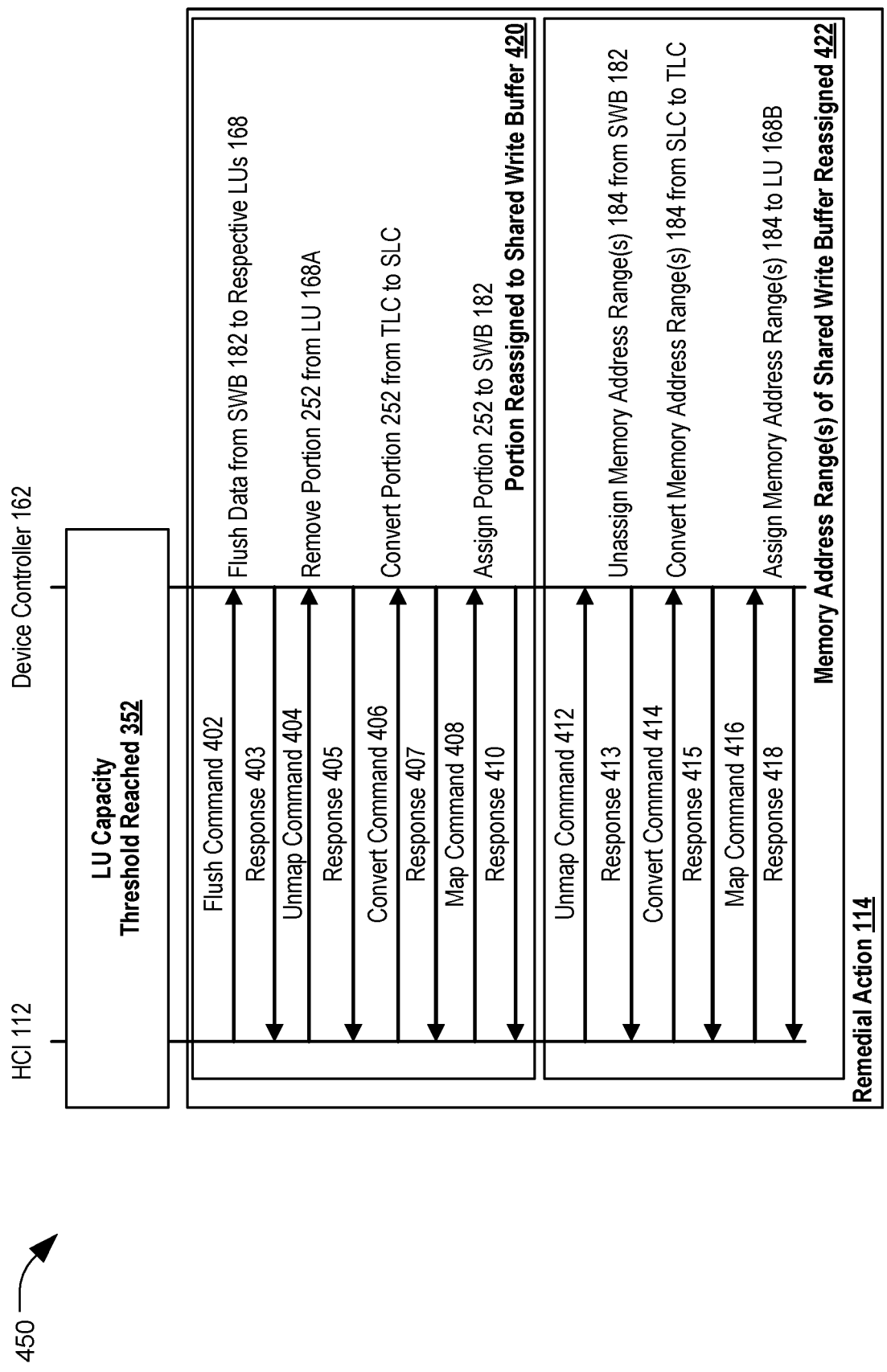
FIG. 4B is a ladder diagram of an illustrative aspect of operations associated with the remedial action of FIG. 4A, in accordance with some examples of the present disclosure.

In an example, the HCI 112 of FIG. 2 performs the remedial action 114 including sending the one or more remedial action commands 178 to the device controller 162 to flush data from the shared write buffer 182, reassign the portion 252 corresponding to the memory address range(s) 190AA from the logical unit 168A to the shared write buffer 182, and to reassign the memory address range(s) 184 from the shared write buffer 182 to the logical unit 168B, as further described with reference to FIG. 4B. In some aspects, the HCI 112 performs the remedial actions 114 to reassign the portion 252 to the shared write buffer 182 based at least in part on determining that the write buffer mode 170 is enabled, that the preserve user space mode 270 is enabled, and that the configuration mode 278 is disabled.

The device controller 162, in response to receiving a flush command, stores data from the shared write buffer 182 to respective logical units and updates the utilization metrics 274. The device controller 162, in response to reassigning the memory address range(s) 190AA from the logical unit 168A to the shared write buffer 182, updates the utilization metric 274A based on removing memory cells corresponding to the memory address range(s) 190AA from the logical unit 168A.

The device controller 162, in response to reassigning the memory address range(s) 184 from the shared write buffer 182 to the logical unit 168B, updates the utilization metric 274B based on adding memory cells corresponding to the memory address range(s) 184 to the logical unit 168B. In a particular aspect, the updated utilization metric 274B no longer exceeds (e.g., is less than or equal to) the logical unit capacity threshold 272. As a result, when the preserve user space mode 270 is enabled, a default mechanism of the system 200—e.g., making the shared write buffer 182 unavailable by reassigning memory cells of the shared write buffer 182 to a full logical unit in accordance with a UFS standard—can be circumvented by the host device 102 preventing the logical units 168 from running out of space.

Referring to FIG. 4B, a ladder diagram is shown of an illustrative aspect of operations 450 associated with the remedial action 114 of FIG. 4A. In a particular aspect, one or more of the operations 450 are performed by the HCI 112, the host device 102, the device controller 162, the flash memory 164, the flash memory device 104, the system 100 of FIG. 1, the system 200 of FIG. 2, or a combination thereof.

The remedial action 114 is performed subsequent to the LU capacity threshold reached 352. In some aspects, the HCI 112 selects the remedial action 114 to be performed based on determining that the preserve user space mode 270 is enabled and the configuration mode 278 is disabled. The remedial action 114 includes, at block 420, reassigning a portion of the least utilized logical unit to the shared write buffer. For example, the HCI 112 sends a flush command 402 to the flash memory device 104. The device controller 162, in response to receiving the flush command 402, flushes data from the shared write buffer 182 to respective logical units 168 and updates the utilization metrics 274, as described with reference to FIG. 2. The device controller 162, subsequent to writing the data to the respective logical units 168, sends a response 403 to the host device 102 indicating that data from the shared write buffer 182 was flushed successfully.

The HCI 112 sends an unmap command 404 to the flash memory device 104 indicating that the portion 252 is to be unmapped from the logical unit 168A. The device controller 162, in response to the unmap command 404, updates the memory mapping table 180 to remove the memory address range(s) 190AA of the portion 252 from the logical unit 168A. The device controller 162 sends a response 405 to the host device 102 indicating that the unmap command has been performed successfully. In a particular aspect, the device controller 162 and the HCI 112 update the utilization metric 274A and the utilization metric 264A, respectively, corresponding to removal of the memory address range(s) 190AA from the logical unit 168A, as described with reference to FIG. 2.

The HCI 112 sends a convert command 406 to the flash memory device 104 to convert the memory address range(s) 190AA from a first memory type (e.g., TLC) to a second memory type (e.g., SLC). The device controller 162, in response to receiving the convert command 406, converts memory cells corresponding to the memory address range(s) 190AA from having the first memory type to the second memory type and sends a response 407 indicating that the convert command has been performed successfully.

The HCI 112 sends a map command 408 to the flash memory device 104 to map the portion 252 to the shared write buffer 182. The device controller 162, in response to receiving the map command 408, updates the memory mapping table 180 to add the memory address range(s) 190AA (in addition to the memory address range(s) 184) as corresponding to the shared write buffer 182, and sends a response 410 to the host device 102 indicating that the map command has been performed successfully. The HCI 112 thus reassigns the portion 252 of the logical unit 168A for use as the shared write buffer 182.

The remedial action 114 also includes, at block 422, reassigning the memory address range(s) 184 of the shared write buffer 182 to the logical unit 168B. The HCI 112 sends an unmap command 412 to the flash memory device 104 indicating that the memory address range(s) 184 are to be unmapped from the shared write buffer 182. The device controller 162, in response to receiving the unmap command 412, updates the memory mapping table 180 to remove the memory address range(s) 184 from the shared write buffer 182. The device controller 162 sends a response 413 to the host device 102 indicating that the unmap command has been performed successfully.

The HCI 112 sends a convert command 414 to the flash memory device 104 to convert the memory address range(s) 184 from the second memory type (e.g., SLC) to the first memory type (e.g., TLC). The device controller 162, in response to receiving the convert command 414, converts memory cells corresponding to the memory address range(s) 184 from having the second memory type to the first memory type and sends a response 415 to the host device 102 indicating that the convert command has been performed successfully.

The HCI 112 sends a map command 416 to the flash memory device 104 to map the memory address range(s) 184 to the logical unit 168B. The device controller 162, in response to receiving the map command 416, updates the memory address range(s) 190B indicated in the memory mapping table 180 as corresponding to the logical unit 168B to include the memory address range(s) 184, and sends a response 418 to the host device 102 indicating that the map command has been performed successfully. The HCI 112 thus reassigns memory (e.g., corresponding to the memory address range(s) 184) of the shared write buffer 182 to the logical unit 168B.

In a particular aspect, the device controller 162 and the HCI 112 update the utilization metric 274B and the utilization metric 264B, respectively, corresponding to addition of the memory address range(s) 184 to the logical unit 168B, as described with reference to FIG. 2. In a particular aspect, the updated utilization metric 274B no longer exceeds the logical unit capacity threshold 272.

The operations 450 thus enable reassigning the portion 252 from the least utilized logical unit to the shared write buffer 182 and reassigning the memory address range(s) 184 from the shared write buffer 182 to the logical unit 168B that is getting full. A technical advantage of reassigning the portion 252 to the shared write buffer 182 includes enabling the shared write buffer 182 to remain in use subsequent to reassignment of the memory address range(s) 184 to the logical unit 168B.

Figure 5A:
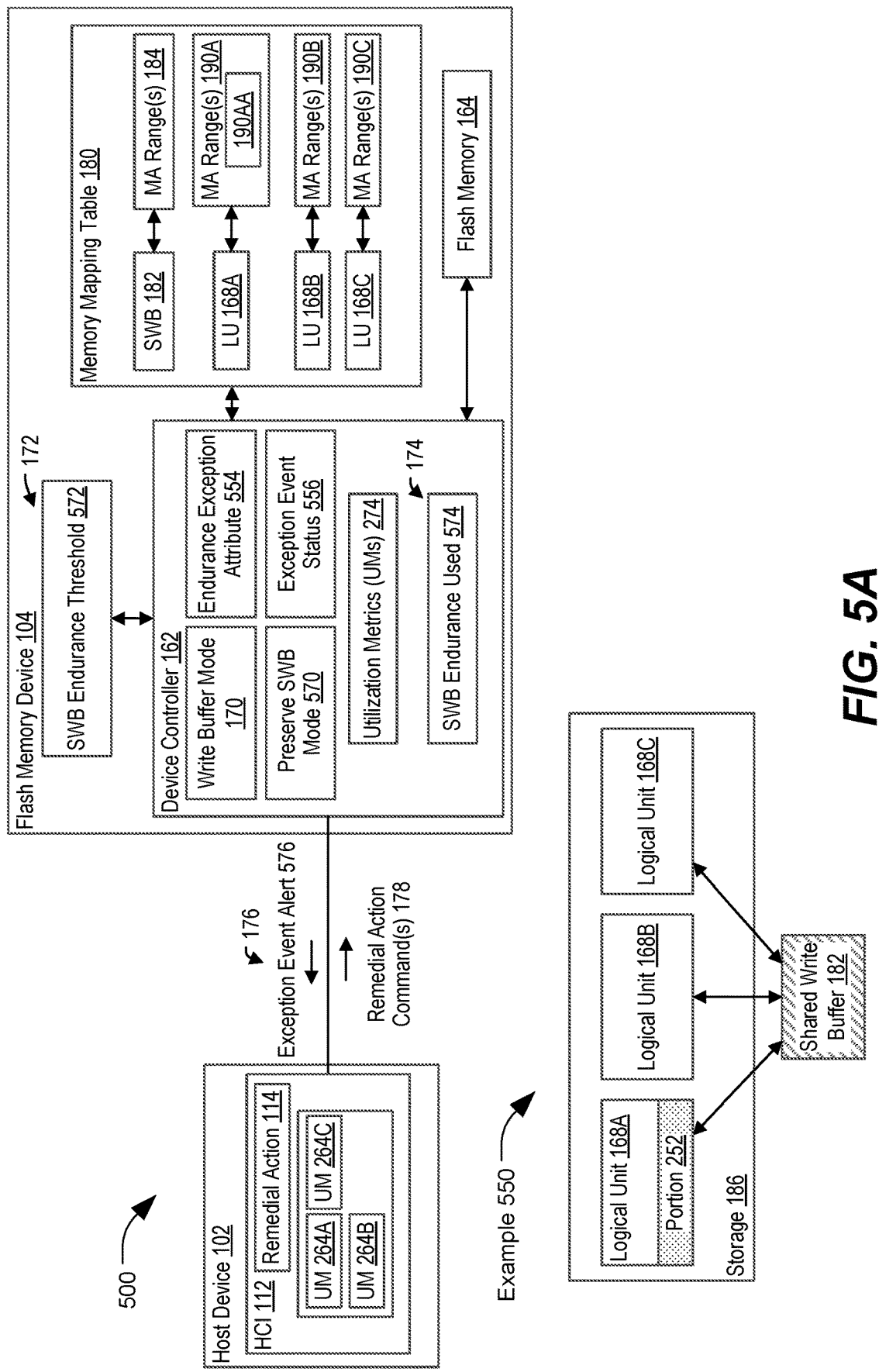
FIG. 5A is a diagram of another illustrative aspect of the system of FIG. 1, in accordance with some examples of the present disclosure.

Referring to FIG. 5A, a particular illustrative aspect is shown of a system 500 that is configured to perform host management of flash memory with a shared write buffer. In a particular aspect, the system 100 of FIG. 1 includes one or more components of the system 500.

The device controller 162 is configured to track a shared write buffer endurance used 574 of the shared write buffer 182. In some aspects, the shared write buffer endurance used 574 indicates a program cycle time of the shared write buffer 182, a count of write commands to, or program/erase (P/E) cycles performed at, the shared write buffer 182, or a combination thereof.

The device controller 162 has access to one or more configuration modes, e.g., the write buffer mode 170, an endurance exception attribute 554, a preserve shared write buffer mode 570, one or more additional configuration modes, or a combination thereof. The configuration mode(s) are based on default data, a configuration setting, a user input, a command from the host device 102, or a combination thereof. For example, in a particular implementation, the HCI 112 sends a command to the flash memory device 104 to set (e.g., enable) the endurance exception attribute 554 (e.g., an exception event control attribute) to activate alert generation corresponding to shared write buffer endurance. The device controller 162 is configured to, when the endurance exception attribute 554 is enabled, generate an exception event alert 576 in response to determining that an exception event status 556 indicates that the shared write buffer endurance used 574 has exceeded a shared write buffer endurance threshold 572.

The shared write buffer endurance threshold 572 indicates an endurance threshold (e.g., a threshold percentage) and the shared write buffer endurance used 574 indicates an endurance used (e.g., a percentage of estimated endurance or lifetime that has been used) of the shared write buffer 182.

In some implementations, the shared write buffer endurance threshold 572 indicates a program cycle time threshold (e.g., a threshold duration) and the shared write buffer endurance used 574 indicates a program cycle time (e.g., a detected program cycle time) of the shared write buffer 182. The device controller 162 updates the program cycle time indicated by the shared write buffer endurance used 574 based on a program cycle time associated with a data write to the shared write buffer 182. In some implementations, the device controller 162 updates the shared write buffer endurance used 574 to indicate a most recent program cycle time of writing data to any memory cell of the shared write buffer 182. In some implementations, the device controller 162 updates the shared write buffer endurance used 574 based on a previous program cycle time indicated by the shared write buffer endurance used 574 and a most recent program cycle time detected by the device controller 162 (e.g., a weighted sum of the previous and most recent program cycle times). In some implementations, the device controller 162 tracks program cycle times of the memory cells 192 of the flash memory 164 and updates the shared write buffer endurance used 574 based on program cycle times of a subset of the memory cells 192 that are included in the shared write buffer 182. For example, the device controller 162 updates the program cycle time indicated by the shared write buffer endurance used 574 based on addition or removal of a portion to the shared write buffer 182. In a particular aspect, the program cycle time exceeding the program cycle time threshold indicates that the shared write buffer 182 is getting worn out.

In some implementations, the shared write buffer endurance threshold 572 indicates a program cycle count threshold (e.g., a threshold count) and the shared write buffer endurance used 574 indicates a count of program cycles performed at memory cells assigned to the shared write buffer 182. The device controller 162 updates (e.g., increments by 1) the count of program cycles indicated by the shared write buffer endurance used 574 based on an erase or write to a memory cell of the shared write buffer 182. In some implementations, the device controller 162 tracks counts of program cycles performed at the memory cells 192 of the flash memory 164 and updates the shared write buffer endurance used 574 based on counts of program cycles of a subset of the memory cells 192 that are included in the shared write buffer 182. In an example, the device controller 162 updates the count of program cycles indicated by the shared write buffer endurance used 574 based on addition or removal of a portion to the shared write buffer 182. In a particular aspect, the count of program cycles exceeding the program cycle count threshold indicates that the shared write buffer 182 is getting worn out.

In some implementations, the shared write buffer endurance threshold 572 is stored in a performance threshold register 172. In other implementations, another type of data storage (e.g., a portion of the flash memory 164) is used to store the shared write buffer endurance threshold 572. In some aspects, data storage of a particular size (e.g., 1 byte) is used to store the shared write buffer endurance threshold 572. In some implementations, a first value (e.g., 00 in hexadecimal) of the shared write buffer endurance threshold 572 indicates that comparisons to the shared write buffer endurance threshold 572 are disabled. A second value of the shared write buffer endurance threshold 572 within a range (e.g., 01 to 09 in hexadecimal) indicates a corresponding endurance used threshold value (e.g., 10 percent to 90 percent). A third value (e.g., 0 A in hexadecimal) of the shared write buffer endurance threshold 572 indicates a corresponding endurance used threshold value (e.g., 100 percent). In a particular aspect, a particular program cycle time corresponds to a worn out memory cell, and the shared write buffer endurance threshold 572 (e.g., 08 in hexadecimal) indicates that a particular percentage (e.g., 80%) of the particular program cycle time corresponds to the endurance used threshold value. In a particular aspect, a particular program cycle count (e.g., 100,000) corresponds to a worn out memory cell, and the shared write buffer endurance threshold 572 (e.g., 08 in hexadecimal) indicates that a particular percentage (e.g., 80%) of the particular program cycle count corresponds to the endurance used threshold value.

The shared write buffer endurance threshold 572 is based on default data, a configuration setting, a user input, a command from the host device 102, or a combination thereof. For example, in a particular implementation, the HCI 112 sends a command to the flash memory device 104 to set the shared write buffer endurance threshold 572 to a particular value.

In a particular aspect, the device controller 162 is configured to update the exception event status 556 in response to an update to the shared write buffer endurance used 574. For example, the device controller 162 is configured to, in response to determining that the shared write buffer endurance used 574 is greater than the shared write buffer endurance threshold 572, update the exception event status 556 (e.g., set a particular exception event status attribute) to indicate that the shared write buffer endurance threshold 572 is exceeded by the shared write buffer 182.

In some implementations, the preserve shared write buffer mode 570 is enabled to indicate that a portion of the least utilized logical unit is to be reassigned to the shared write buffer 182 if the shared write buffer 182 is getting worn out, as further described with reference to FIGS. 5B-5D. In some implementations, the preserve shared write buffer mode 570 is disabled to indicate that reassignment of a portion of a logical unit to the shared write buffer 182 when the shared write buffer 182 is getting worn out is disabled.

During operation, the HCI 112 sends a command to the flash memory device 104 to set the endurance exception attribute 554 to activate alert generation corresponding to shared write buffer endurance. In some implementations, the HCI 112 also sends a command to enable the preserve shared write buffer mode 570. Subsequently, the device controller 162, in response to determining that the endurance exception attribute 554 indicates that the alert generation is activated and that the exception event status 556 indicates that the shared write buffer endurance threshold 572 is exceeded by the shared write buffer endurance used 574, generates an exception event alert 576 indicating that endurance used of the shared write buffer 182 has exceeded the shared write buffer endurance threshold 572. In a particular aspect, the device controller 162 generates the exception event alert 576 further based on determining that each of the write buffer mode 170 and the preserve shared write buffer mode 570 are enabled. In a particular aspect, the shared write buffer endurance threshold 572 corresponds to a value of the performance threshold register 172 and the exception event alert 576 corresponds to the notification 176. The device controller 162 sends the exception event alert 576 to the host device 102.

The HCI 112 performs a remedial action 114 in response to receiving the exception event alert 576 indicating that the shared write buffer endurance threshold 572 is exceeded by the endurance of the shared write buffer 182 when the write buffer mode 170 and the preserve shared write buffer mode 570 are enabled. The HCI 112 generates one or more remedial action commands 178 based on the utilization metrics 264. In some implementations, the utilization metrics 264 are a copy of the utilization metrics 274 and the HCI 112 receives the utilization metrics 264 from the device controller 162 concurrently with receiving the exception event alert 576. In some implementations, the utilization metrics 264 are generated and maintained by the HCI 112. The utilization metrics 264 can indicate a used storage capacity of the logical units 168 and can also indicate endurance used of the logical units 168, as described with reference to FIG. 2.

The HCI 112 determines, based on the utilization metrics 264, that the logical unit 168A corresponds to a least utilized logical unit of the logical units 168, as described with reference to FIG. 2. For example, the HCI 112 determine that the logical unit 168A corresponds to the least utilized logical unit based on determining that a value indicated by the utilization metric 264A is lowest among the utilization metrics 264. In a particular aspect, the utilization metric 264A indicates a count of write commands to the logical unit 168A, a program cycle count of the logical unit 168A, a program cycle time of the logical unit 168A, an available storage capacity of the logical unit 168A, or a combination thereof.

In some implementations, the utilization metric 264A indicates an endurance used (or available endurance) of the logical unit 168A and storage capacity used (or available storage capacity) of the logical unit 168A, and the HCI 112 determines that the logical unit 168A corresponds to the least utilized logical unit based on a combined value of the endurance used and the storage capacity used. For example, the count of write commands to the logical unit 168A, the program cycle count of the logical unit 168A, the program cycle time of the logical unit 168A, or a combination thereof, indicate the endurance used.

In an example 550, the HCI 112 selects a portion 252 of the logical unit 168A (e.g., the least utilized logical unit). In a particular aspect, the portion 252 corresponds to unused memory cells corresponding to memory address range(s) 190AA included in the memory address range(s) 190A of the logical unit 168A. The HCI 112 performs the remedial action 114 including reassigning the portion 252 to the shared write buffer 182, as further described with reference to FIGS. 5B-5D.

Figure 5B:
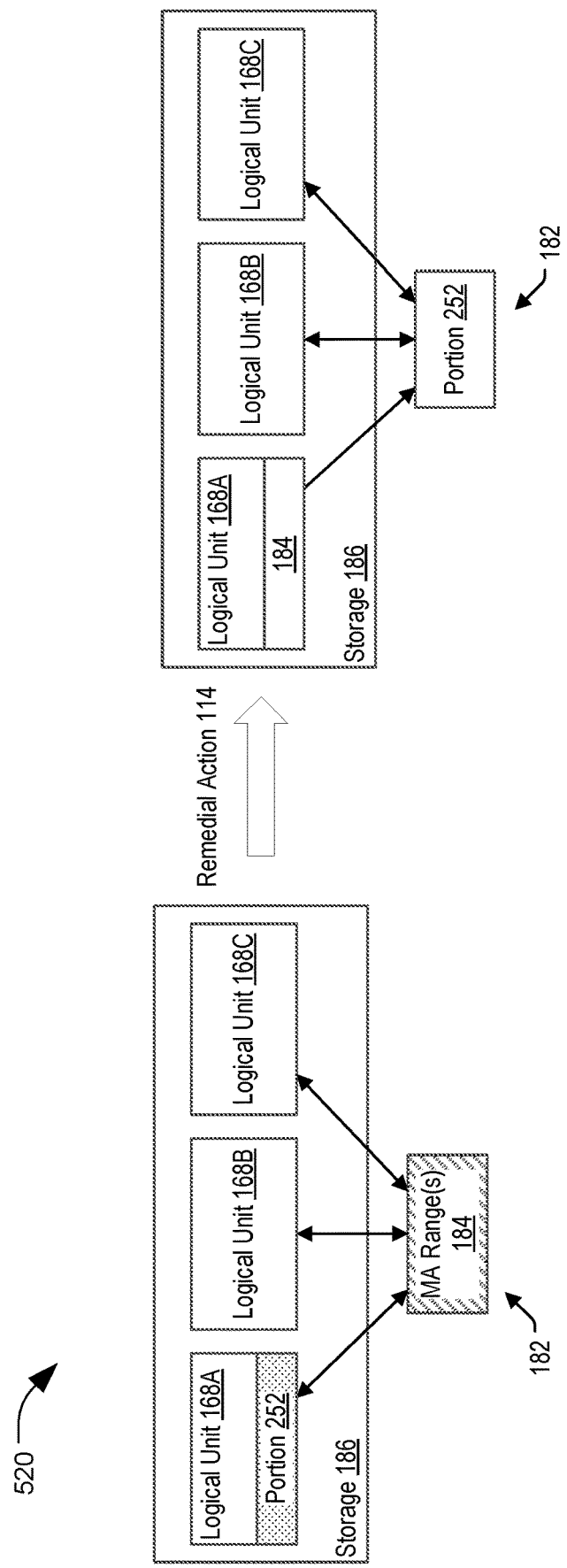
FIG. 5B is a diagram of a particular illustrative aspect of a remedial action that can be performed by the system of FIG. 5A, in accordance with some examples of the present disclosure.

Referring to FIG. 5B, a diagram is shown of an example 520 of remedial actions 114 that can be performed by the system 500 of FIG. 5A. The remedial actions 114 include reassigning the portion 252 to the shared write buffer 182.

In a particular aspect, the HCI 112 of FIG. 2 performs the remedial action 114 based at least in part on determining that the preserve shared write buffer mode 570 is enabled. In an example, the HCI 112 of FIG. 2 performs the remedial action 114 including sending the one or more remedial action commands 178 to the device controller 162 to reassign the portion 252 corresponding to the memory address range(s) 190AA from the logical unit 168A to the shared write buffer 182, as further described with reference to FIG. 5C. In some implementations, the remedial action 114 also includes sending the remedial action commands 178 to the device controller 162 to reassign the memory address range(s) 184 from the shared write buffer 182 to the logical unit 168A or another logical unit, as further described with reference to FIG. 5C.

In a particular aspect, the device controller 162 updates the utilization metric 274A and the shared write buffer endurance used 574 based on reassigning memory cells corresponding to the memory address range(s) 190AA from the logical unit 168A to the shared write buffer 182, reassigning memory cells corresponding to the memory address range(s) 184 from the shared write buffer 182 to the logical unit 168A, or both. In a particular aspect, the updated shared write buffer endurance used 574 no longer exceeds (e.g., is less than or equal to) the shared write buffer endurance threshold 572.

Figure 5C:
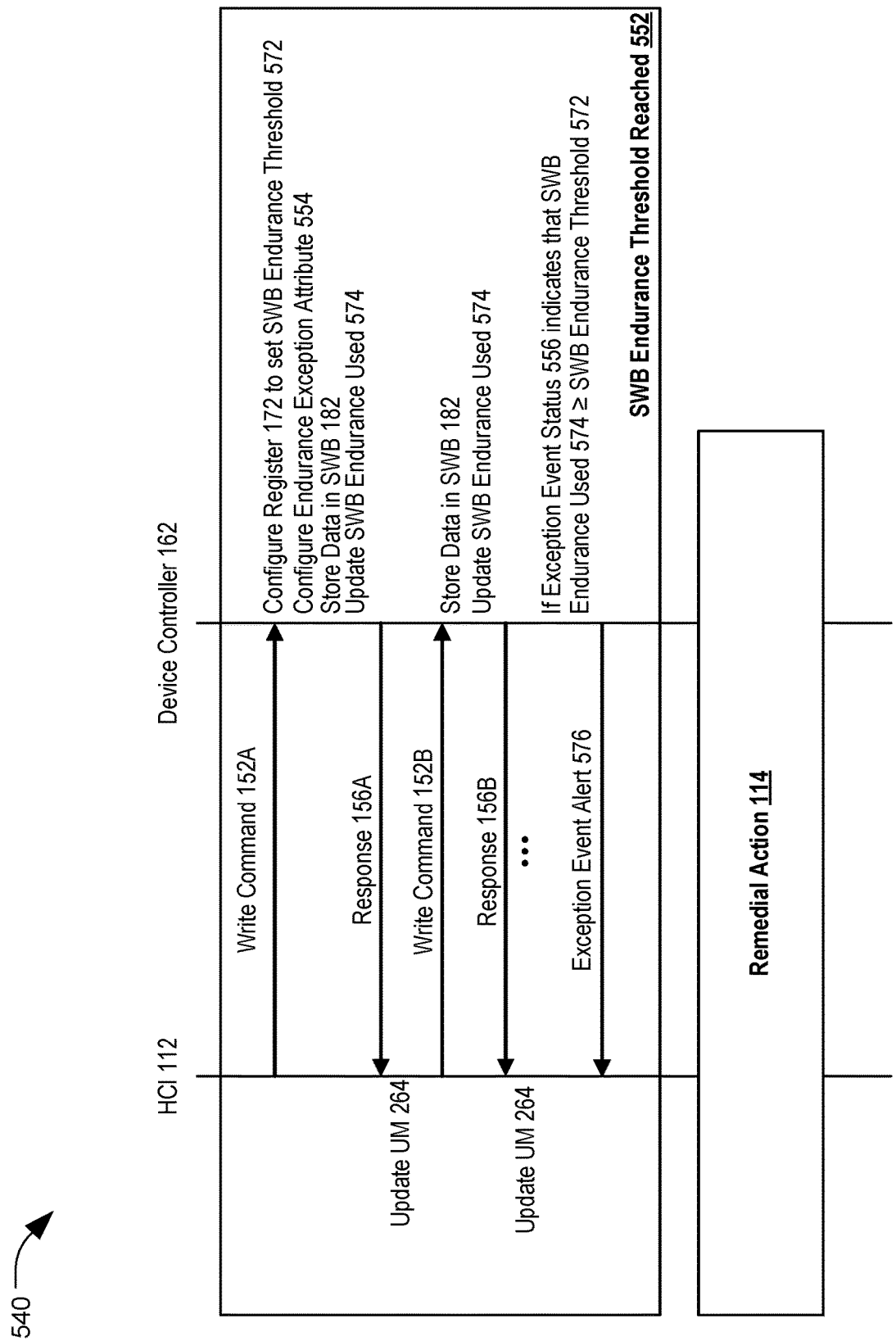
FIG. 5C is a ladder diagram of an illustrative aspect of operations associated with the remedial action of FIG. 5B, in accordance with some examples of the present disclosure.
Figure 5D:
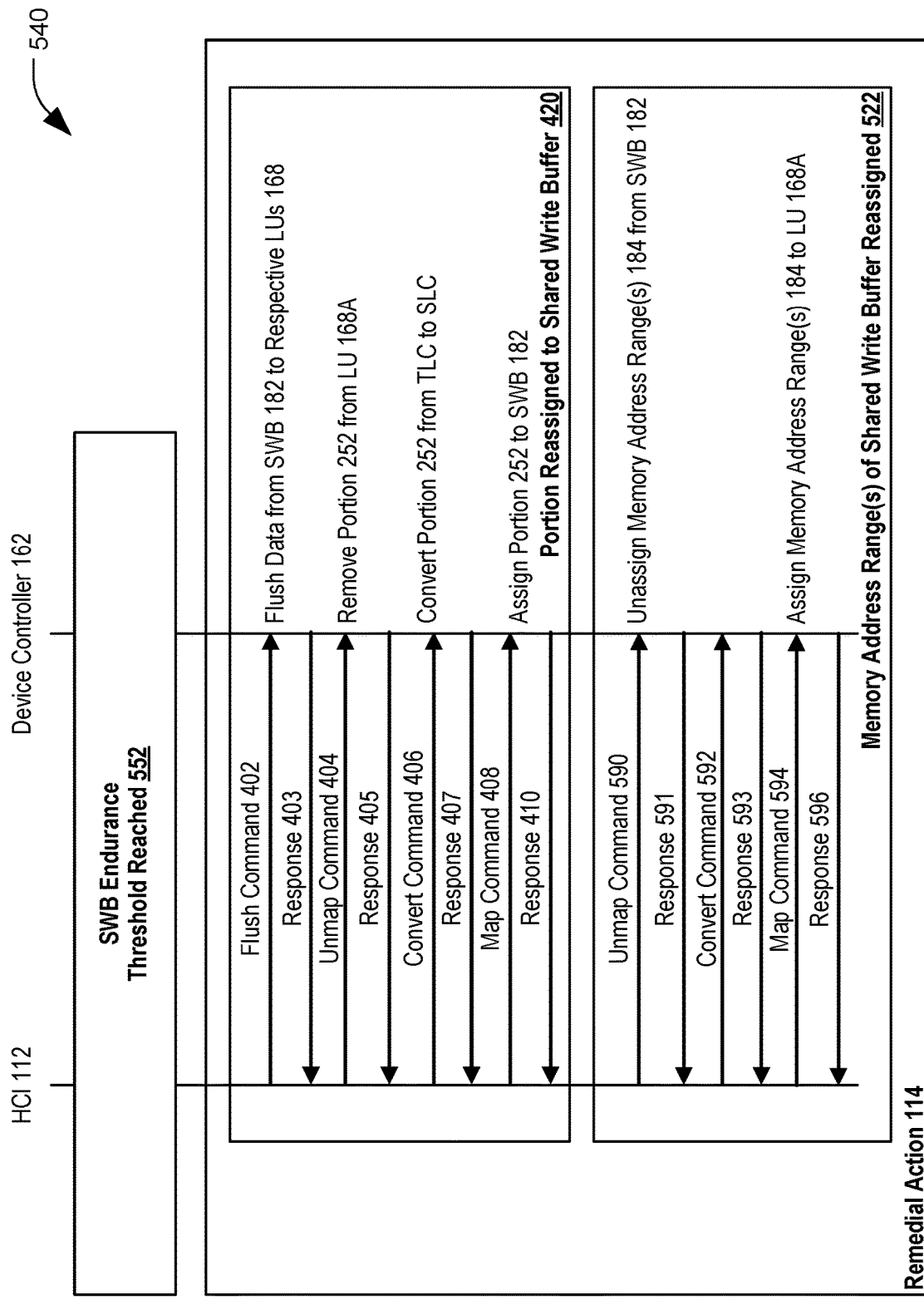
FIG. 5D is a ladder diagram of an illustrative aspect of the operations of FIG. 5C, in accordance with some examples of the present disclosure.

Referring to FIGS. 5C-5D, a ladder diagram is shown of an illustrative aspect of operations 540 associated with the remedial action 114 of FIG. 5B. In a particular aspect, one or more of the operations 540 are performed by the HCI 112, the host device 102, the device controller 162, the flash memory 164, the flash memory device 104, the system 100 of FIG. 1, the system 500 of FIG. 5A, or a combination thereof.

An example of operations corresponding to a shared write buffer endurance threshold reached 552 is illustrated. For example, the HCI 112 sends a write command 152A to the device controller 162. In some implementations, the HCI 112 updates a utilization metric 264 concurrently with sending the write command 152A. For example, the write command 152A indicates that the data is to be written to the logical unit 168B, and the HCI 112 updates the utilization metric 264B (e.g., a count of write commands, a used storage capacity, or both) of the logical unit 168B.

The device controller 162, in response to receiving the write command 152A and determining that the write buffer mode 170 is enabled, configures the performance threshold register 172 to set the shared write buffer endurance threshold 572 (e.g., a predetermined threshold value), configures the endurance exception attribute 554 to activate alert generation corresponding to shared write buffer endurance used, and stores data indicated in the write command 152A to the shared write buffer 182.

In some implementations, the device controller 162, in response to receiving the command 152A, sets one or more additional configuration modes (e.g., the logical unit capacity threshold 272, the capacity exception attribute 254, or both), as described with reference to FIG. 3B. For example, the shared write buffer endurance threshold 572 is stored in a first performance threshold register 172 and the logical unit capacity threshold 272 is stored in a second performance threshold register 172. In some implementations, the capacity exception attribute 254 and the endurance exception attribute 554 can both be enabled at the same time. For example, the HCI 112 is configured to perform the remedial action 114 described with reference to FIGS. 2-4B in response to receiving the exception event alert 276 and to perform the remedial action 114 described with reference to FIGS. 5A-5D in response to receiving the exception event alert 576.

The device controller 162 updates the shared write buffer endurance used 574 based on writing data to the shared write buffer 182. For example, the device controller 162, responsive to writing the data to the shared write buffer 182, updates a count of program cycles, a program cycle time, or a combination thereof, indicated by the shared write buffer endurance used 574.

In a particular aspect, the device controller 162 updates the exception event status 556 based on a comparison of the shared write buffer endurance used 574 and the shared write buffer endurance threshold 572. For example, the device controller 162, in response to determining that the shared write buffer endurance used 574 does not exceed the shared write buffer endurance threshold 572, sets the exception event status 556 to indicate that endurance used of the shared write buffer 182 does not exceed the shared write buffer endurance threshold 572 and refrains from generating an exception event alert 576. The device controller 162, in response to storing the data in the shared write buffer 182, sends a response 156A to the HCI 112 indicating that the data write is successful.

In a particular aspect, the HCI 112 sends one or more additional commands to the device controller 162 and receives respective responses from the device controller 162. For example, the HCI 112 sends a write command 152B to the device controller 162 and updates the utilization metrics 264. The device controller 162, in response to receiving the write command 152B, stores data indicated in the write command 152B to the shared write buffer 182, updates the shared write buffer endurance used 574, and sends a response 156B to the HCI 112.

In a particular aspect, the device controller 162 updates the exception event status 556 based on a comparison of the shared write buffer endurance used 574 and the shared write buffer endurance threshold 572. For example, the device controller 162, in response to determining that the shared write buffer endurance used 574 exceeds the shared write buffer endurance threshold 572, updates the exception event status 556 to indicate that endurance used of the shared write buffer 182 exceeds the shared write buffer endurance threshold 572. The device controller 162, in response to determining that the exception event status 556 indicates that endurance used of the shared write buffer 182 exceeds the shared write buffer endurance threshold 572, that the preserve shared write buffer mode 570 is enabled, and that the endurance exception attribute 554 indicates that alert generation is activated, sends an exception event alert 576 to the HCI 112 indicating that endurance used of the shared write buffer 182 has exceeded the shared write buffer endurance threshold 572.

The HCI 112 performs the remedial action 114 in response to receiving the exception event alert 576. In a particular aspect, the HCI 112 performs the remedial action 114 based at least in part on determining that the preserve shared write buffer mode 570 is enabled. In FIG. 5D, the remedial action 114 includes, at block 420, reassignment of a portion of the least utilized logical unit to the shared write buffer, as described with reference to FIG. 4B. The device controller 162 also updates the shared write buffer endurance used 574 based on updates to the shared write buffer 182. For example, the device controller 162, in response to performing the flush command 402, updates the shared write buffer endurance used 574 corresponding to an erase of the shared write buffer 182, as described with reference to FIG. 5A. As another example, the device controller 162, in response to performing the map command 408, updates the shared write buffer endurance used 574 corresponding to an addition of the portion 252 to the shared write buffer 182, as described with reference to FIG. 5A.

The remedial action 114 also includes, at block 522, reassignment of memory address range(s) of the shared write buffer. For example, the HCI 112 sends an unmap command 590 to the flash memory device 104 indicating that the memory address range(s) 184 are to be unmapped from the shared write buffer 182. The device controller 162, in response to receiving the unmap command 590, updates the memory mapping table 180 to remove the memory address range(s) 184 from the shared write buffer 182 and sends a response 591 to the host device 102 indicating that the unmap command has been performed successfully. The device controller 162 also updates the shared write buffer endurance used 574 corresponding to removal of the memory address range(s) 184 from the shared write buffer 182, as described with reference to FIG. 5A.

The HCI 112 sends a convert command 592 to the flash memory device 104 to convert the memory address range(s) 184 from the second memory type (e.g., SLC) to the first memory type (e.g., TLC). The device controller 162, in response to receiving the convert command 592, converts memory cells corresponding to the memory address range(s)

184 from having the second memory type to the first memory type and sends a response 593 to the host device 102 indicating that the convert command has been performed successfully.

The HCI 112 sends a map command 594 to the flash memory device 104 to map the memory address range(s) 184 to the logical unit 168A. The device controller 162, in response to receiving the map command 594, updates the memory address range(s) 190A (indicated in the memory mapping table 180 as corresponding to the logical unit 168A) to include the memory address range(s) 184, and sends a response 596 to the host device 102 indicating that the map command has been performed successfully. The HCI 112 thus reassigns memory (e.g., corresponding to the memory address range(s) 184) of the shared write buffer 182 to the logical unit 168A. In a particular aspect, the device controller 162 and the HCI 112 update the utilization metric 274A and the utilization metric 264A, respectively, corresponding to addition of the memory address range(s) 184 to the logical unit 168A, as described with reference to FIG. 5A. In alternative implementations, the HCI 112 can reassign memory (e.g., corresponding to the memory address range(s) 184) of the shared write buffer 182 to another logical unit (e.g., a most utilized logical unit).

The operations 540 thus enable reassigning the portion 252 from the least utilized logical unit to the shared write buffer 182 that is getting worn out, and assigning the memory address range(s) 184 of the shared write buffer 182 to the logical unit 168A. A technical advantage of swapping the memory address range(s) 184 and the portion 252 includes enabling the shared write buffer 182 to remain in use and to prolong a lifespan of the memory cells corresponding to memory address range(s) 184.

Figure 6:
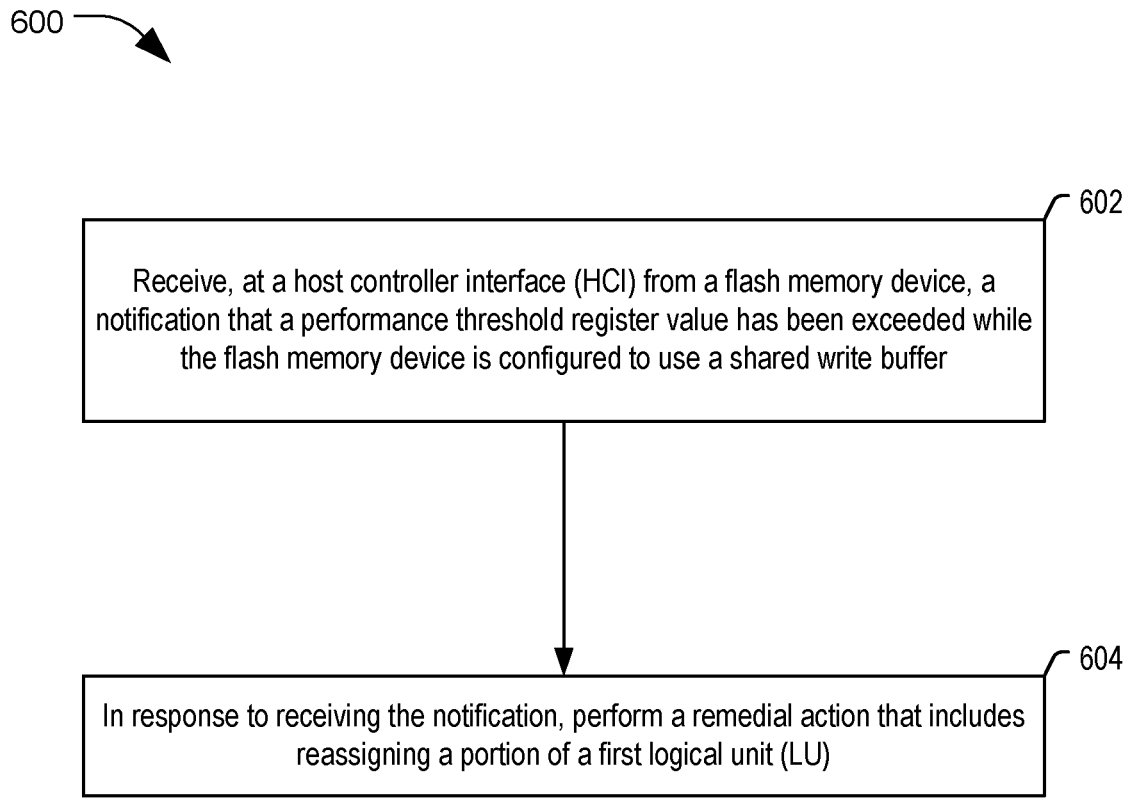
FIG. 6 is a diagram of a particular implementation of a method of host management of flash memory with a shared write buffer that may be performed by the system of FIG. 1, in accordance with some examples of the present disclosure.

FIG. 6 is a diagram of a particular implementation of a method 600 of host management of flash memory with a shared write buffer that may be performed by the system 100 of FIG. 1, in accordance with some examples of the present disclosure. In a particular aspect, one or more of the operations of the method 600 are performed by the HCI 112, the host device 102, the device controller 162, the flash memory 164, the flash memory device 104, the system 100 of FIG. 1, the system 200 of FIG. 2, the system 500 of FIG. 5, or a combination thereof.

The method 600 includes, at block 602, receiving, at a host controller interface (HCI) from a flash memory device, a notification that a performance threshold register value has been exceeded while the flash memory device is configured to use a shared write buffer. In an example, the HCI 112 receives the exception event alert 276 indicating that the logical unit capacity threshold 272 has been exceeded by the logical unit 168B while the write buffer mode 170 indicates that the flash memory device 104 is configured to use the shared write buffer 182, as described with reference to FIG. 2. In another example, the HCI 112 receives the exception event alert 576 indicating that the shared write buffer endurance threshold 572 has been exceeded while the write buffer mode 170 indicates that the flash memory device 104 is configured to use the shared write buffer 182, as described with reference to FIG. 5A.

The method 600 also includes, at block 604, in response to receiving the notification, performing a remedial action that includes reassigning a portion of a first logical unit (LU). In an example, the HCI 112 performs the remedial action 114 including reassigning the portion 252 to the logical unit 168B, as described with reference to FIG. 3B. To illustrate, the portion 252 is reassigned to the logical unit 168B that is getting full. In another example, the HCI 112 performs the remedial action 114 including reassigning the portion 252 to the shared write buffer 182 and reassigning the memory address range(s) 184 of the shared write buffer 182 to the logical unit 168B that is getting full, as described with reference to FIG. 4B. In yet another example, the HCI 112 performs the remedial action 114 including reassigning the portion 252 to the shared write buffer 182 that is getting worn out, as described with reference to FIG. 5C.

The method 600 thus enables the shared write buffer 182 to remain available for use subsequent to the logical unit 168B getting full, the shared write buffer 182 getting worn out, or both.

The method 600 of FIG. 6 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 of FIG. 6 may be performed by a processor that executes instructions, such as described with reference to FIG. 7.

Figure 7:
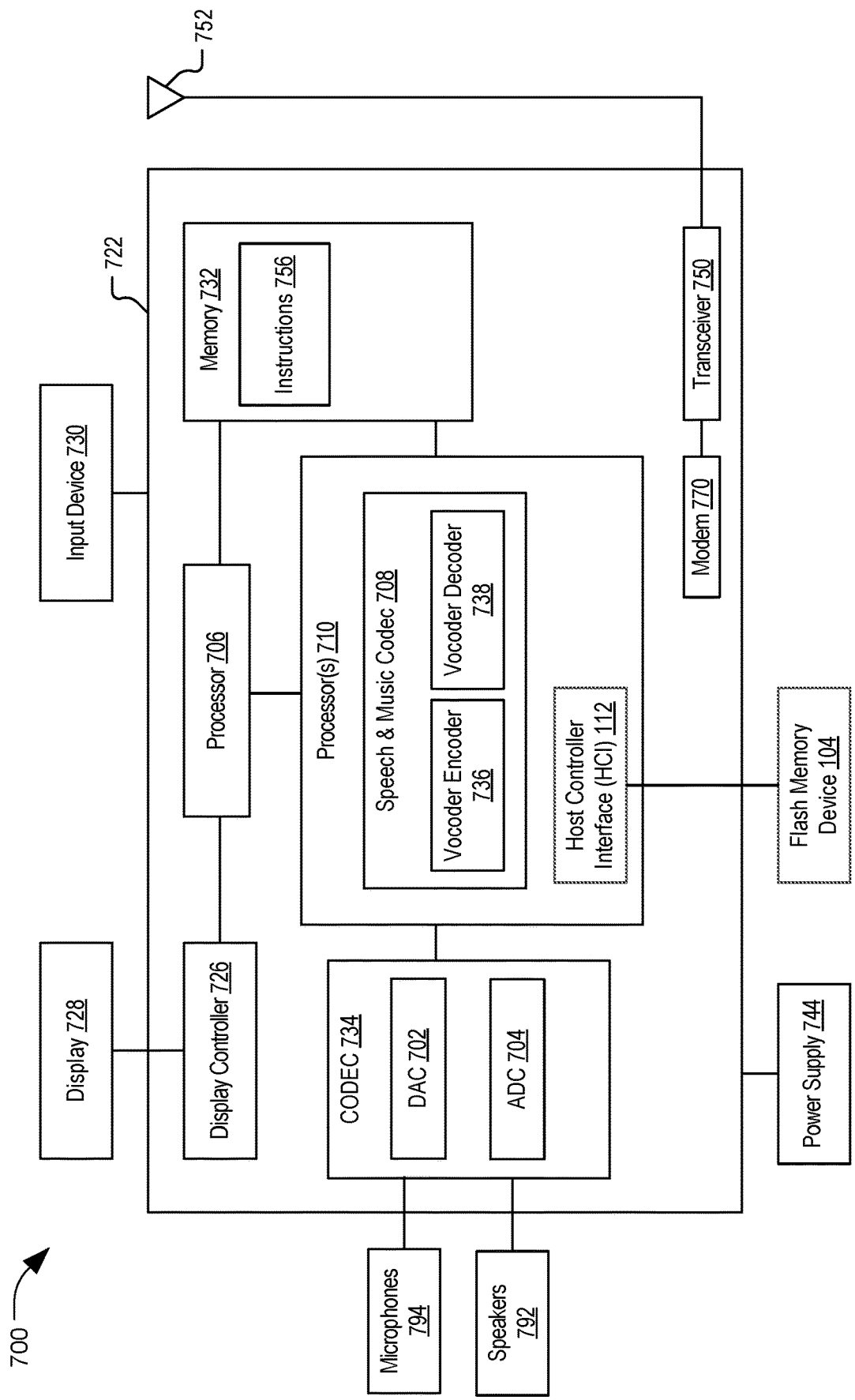
FIG. 7 is a block diagram of a particular illustrative example of a device that is operable to perform host management of flash memory with a shared write buffer, in accordance with some examples of the present disclosure.

Referring to FIG. 7, a block diagram of a particular illustrative implementation of a device is depicted and generally designated 700. In various implementations, the device 700 may have more or fewer components than illustrated in FIG. 7. In an illustrative implementation, the device 700 may correspond to the host device 102. In an illustrative implementation, the device 700 may perform one or more operations described with reference to FIGS. 1-6.

In a particular implementation, the device 700 includes a processor 706 (e.g., a CPU). The device 700 may include one or more additional processors 710 (e.g., one or more DSPs). The processors 710 may include a speech and music coder-decoder (CODEC) 708 that includes a voice coder ("vocoder") encoder 736, a vocoder decoder 738, or both. The processors 710 may include the HCI 112 that is configured to be coupled to the flash memory device 104.

The device 700 may include a memory 732 and a CODEC 734. The memory 732 may include instructions 756, that are executable by the one or more additional processors 710 (or the processor 706) to implement the functionality described with reference to the HCI 112. The device 700 may include a modem 770 coupled, via a transceiver 750, to an antenna 752.

The device 700 may include a display 728 coupled to a display controller 726. One or more speakers 792 and one or more microphones 794 may be coupled to the CODEC 734. The CODEC 734 may include a digital-to-analog converter (DAC) 702, an analog-to-digital converter (ADC) 704, or both. In a particular implementation, the CODEC 734 may receive analog signals from the microphone(s) 794, convert the analog signals to digital signals using the analog-to-digital converter 704, and provide the digital signals to the speech and music codec 708. The speech and music codec 708 may process the digital signals. In a particular implementation, the speech and music codec 708 may provide digital signals to the CODEC 734. The CODEC 734 may convert the digital signals to analog signals using the digital-to-analog converter 702 and may provide the analog signals to the speaker(s) 792.

In a particular implementation, the device 700 may be included in a system-in-package or system-on-chip device 722. In a particular implementation, the memory 732, the processor 706, the processors 710, the display controller 726, the CODEC 734, and the modem 770 are included in the system-in-package or system-on-chip device 722. In a particular implementation, an input device 730, a power supply 744, and the flash memory device 104 are coupled to the system-in-package or the system-on-chip device 722. Moreover, in a particular implementation, as illustrated in FIG. 7, the display 728, the input device 730, the speaker(s) 792, the microphone(s) 794, the antenna 752, the flash memory device 104, and the power supply 744 are external to the system-in-package or the system-on-chip device 722. In a particular implementation, each of the display 728, the input device 730, the speaker(s) 792, the microphone(s) 794, the antenna 752, the flash memory device 104, and the power supply 744 may be coupled to a component of the system-in-package or the system-on-chip device 722, such as an interface or a controller. For example, the flash memory device 104 may be coupled to the HCI 112.

The device 700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for receiving, at a host controller interface (HCI) from a flash memory device, a notification that a performance threshold register value has been exceeded while the flash memory device is configured to use a shared write buffer. For example, the means for receiving the notification can correspond to the HCI 112, the host device 102, the system 100 of FIG. 1, the system 200 of FIG. 2, the system 500 of FIG. 5, the processor 706, the processor(s) 710, one or more other circuits or components configured to receive the notification, or any combination thereof.

The apparatus also includes means for performing a remedial action that includes reassigning a portion of a first logical unit (LU), the remedial action performed in response to receiving the notification. For example, the means for performing the remedial action can correspond to the HCI 112, the host device 102, the device controller 162, the flash memory device 104, the system 100 of FIG. 1, the system 200 of FIG. 2, the system 500 of FIG. 5, the processor 706, the processor(s) 710, one or more other circuits or components configured to perform a remedial action, or any combination thereof.

In some implementations, a non-transitory computer-readable medium (e.g., a computer-readable storage device, such as the memory 732) includes instructions (e.g., the instructions 756) that, when executed by one or more processors (e.g., the one or more processors 710 or the processor 706), cause the one or more processors to receive, at a host controller interface (HCI) (e.g., the HCI 112) from a flash memory device (e.g., the flash memory device 104), a notification (e.g., the notification 176, the exception event alert 276, the exception event alert 576) that a performance threshold register value (e.g., a value of the performance threshold register 172, the logical unit capacity threshold 272, the shared write buffer endurance threshold 572) has been exceeded while the flash memory device is configured to use a shared write buffer (e.g., the shared write buffer 182). The instruction further cause the one or more processors to, in response to receiving the notification, perform a remedial action (e.g., the remedial action 114) that includes reassigning a portion (e.g., the portion 252) of a first logical unit (LU) (e.g., the logical unit 168A).

Particular aspects of the disclosure are described below in sets of interrelated Examples:

According to Example 1, a host device includes a host controller interface (HCI) configured to be coupled to a flash memory device and configured to receive a notification from the flash memory device that a performance threshold register value has been exceeded while the flash memory device is configured to use a shared write buffer; and in response to receiving the notification, perform a remedial action that includes reassigning a portion of a first logical unit (LU).

Example 2 includes the host device of Example 1, wherein the reassigning the portion of the first LU includes sending an unmap command to the flash memory device to update a memory mapping table at the flash memory device.

Example 3 includes the host device of Example 1 or Example 2, wherein the remedial action further includes sending a command to the flash memory device to convert the portion of the first LU from a first memory type to a second memory type.

Example 4 includes the host device of Example 3, wherein the first memory type is triple-level cell (TLC), and the second memory type is single-level cell (SLC).

Example 5 includes the host device of any of Examples 1 to 4, wherein the HCI is configured to reassign memory of the shared write buffer to a second LU; and reassign the portion of the first LU for use as the shared write buffer.

Example 6 includes the host device of Example 5, wherein the HCI is configured to send a command to the flash memory device to flush the shared write buffer prior to reassigning the memory of the shared write buffer to the second LU.

Example 7 includes the host device of Example 1 or Example 2, wherein the HCI is configured to reassign the portion of the first LU to a second LU of the flash memory device.

Example 8 includes the host device of any of Examples 1 to 7, wherein the performance threshold register value corresponds to a LU capacity threshold, and wherein the notification indicates that a utilization of a second LU of the flash memory device has exceeded the LU capacity threshold.

Example 9 includes the host device of Example 8, wherein the notification includes an exception event alert.

Example 10 includes the host device of Example 9, wherein the HCI sends a command to the flash memory device to set an exception event control attribute to activate alert generation corresponding to LU capacity, and wherein the exception event alert is generated in response to a determination that the exception event control attribute indicates that the alert generation is activated and that an exception event status indicates that the utilization of the second LU of the flash memory device has exceeded the LU capacity threshold.

Example 11 includes the host device of Example 1 or Example 2, wherein the performance threshold register value corresponds to a shared write buffer endurance threshold, and wherein the notification indicates that an endurance used of the shared write buffer has exceeded the shared write buffer endurance threshold.

Example 12 includes the host device of Example 11, wherein the notification includes an exception event alert.

Example 13 includes the host device of Example 12, wherein the HCI sends a command to the flash memory device to set an exception event control attribute to activate alert generation corresponding to shared write buffer endurance, and wherein the exception event alert is generated in response to a determination that the exception event control attribute indicates that the alert generation is activated and that an exception event status indicates that the endurance used of the shared write buffer has exceeded the shared write buffer endurance threshold.

Example 14 includes the host device of any of Examples 11 to 13, wherein the HCI is configured to determine the endurance used of the shared write buffer based on a count of program cycles performed at the shared write buffer, a program cycle time of the shared write buffer, or both.

Example 15 includes the host device of any of Examples 1 to 14, wherein the HCI is configured to identify the first LU based on detecting that first LU has corresponds to a least utilized LU among a plurality of LUs.

Example 16 includes the host device of Example 15, wherein the HCI is configured to determine that the first LU corresponds to the least utilized LU based on values of a utilization array.

Example 17 includes the host device of Example 15 or Example 16, wherein the HCI is configured to determine that the first LU corresponds to the least utilized LU based on determining that the first LU has a largest available storage capacity among the plurality of LUs.

Example 18 includes the host device of any of Examples 15 to 17, wherein the HCI is configured to determine that the first LU corresponds to the least utilized LU based on a count of write commands to the first LU, a program cycle count of the first LU, a program cycle time of the first LU, an available storage capacity of the first LU, or a combination thereof.

According to Example 19, a method includes receiving, at a host controller interface (HCI) from a flash memory device, a notification that a performance threshold register value has been exceeded while the flash memory device is configured to use a shared write buffer; and in response to receiving the notification, performing a remedial action that includes reassigning a portion of a first logical unit (LU).

Example 20 includes the method of Example 19, wherein the reassigning the portion of the first LU includes sending an unmap command to the flash memory device to update a memory mapping table at the flash memory device.

Example 21 includes the method of Example 19 or Example 20, wherein the remedial action further includes sending a command to the flash memory device to convert the portion of the first LU from a first memory type to a second memory type.

Example 22 includes the method of Example 21, wherein the first memory type is triple-level cell (TLC), and the second memory type is single-level cell (SLC).

Example 23 includes the method of any of Examples 19 to 22, and further includes reassigning memory of the shared write buffer to a second LU, wherein the portion of the first LU is reassigned for use as the shared write buffer.

Example 24 includes the method of Example 23, and further includes sending a command to the flash memory device to flush the shared write buffer prior to reassigning the memory of the shared write buffer to the second LU.

Example 25 includes the method of Example 19 or Example 20, wherein the portion of the first LU is reassigned to a second LU of the flash memory device.

Example 26 includes the method of any of Examples 19 to 25, wherein the performance threshold register value corresponds to a LU capacity threshold, and wherein the notification indicates that a utilization of a second LU of the flash memory device has exceeded the LU capacity threshold.

Example 27 includes the method of Example 26, wherein the notification includes an exception event alert.

Example 28 includes the method of Example 27, and further includes sending a command to the flash memory device to set an exception event control attribute to activate alert generation corresponding to LU capacity, wherein the exception event alert is generated in response to determining that the exception event control attribute indicates that the alert generation is activated and that an exception event status indicates that the utilization of the second LU of the flash memory device has exceeded the LU capacity threshold.

Example 29 includes the method of Example 19 or Example 20, wherein the performance threshold register value corresponds to a shared write buffer endurance threshold, and wherein the notification indicates that an endurance used of the shared write buffer has exceeded the shared write buffer endurance threshold.

Example 30 includes the method of Example 29, wherein the notification includes an exception event alert.

Example 31 includes the method of Example 30, and further includes sending a command to the flash memory device to set an exception event control attribute to activate alert generation corresponding to shared write buffer endurance, wherein the exception event alert is generated in response to a determination that the exception event control attribute indicates that the alert generation is activated and that an exception event status indicates that the endurance used of the shared write buffer has exceeded the shared write buffer endurance threshold.

Example 32 includes the method of any of Examples 29 to 31, and further includes determining the endurance used of the shared write buffer based on a count of program cycles performed at the shared write buffer, a program cycle time of the shared write buffer, or both.

Example 33 includes the method of any of Examples 19 to 32, and further includes identifying the first LU based on detecting that first LU has corresponds to a least utilized LU among a plurality of LUs.

Example 34 includes the method of Example 33, and further includes determining that the first LU corresponds to the least utilized LU based on values of a utilization array.

Example 35 includes the method of Example 33 or Example 34, further includes determining that the first LU corresponds to the least utilized LU based on determining that the first LU has a largest available storage capacity among the plurality of LUs.

Example 36 includes the method of any of Examples 33 to 35, and further includes determining that the first LU corresponds to the least utilized LU based on a count of write commands to the first LU, a program cycle count of the first LU, a program cycle time of the first LU, an available storage capacity of the first LU, or a combination thereof.

According to Example 37, a device includes: a memory configured to store instructions; and a processor configured to execute the instructions to perform the method of any of Examples 19 to 36.

According to Example 38, a non-transitory computer-readable medium stores instructions that, when executed by a processor, cause the processor to perform the method of any of Examples 19 to 36.

According to Example 39, an apparatus includes means for carrying out the method of any of Examples 19 to 36.

According to Example 40, a non-transitory computer-readable medium configured to store instructions that, when executed by one or more processors, cause the one or more processors to receive, at a host controller interface (HCI) from a flash memory device, a notification that a performance threshold register value has been exceeded while the flash memory device is configured to use a shared write buffer; and in response to receiving the notification, perform a remedial action that includes reassigning a portion of a first logical unit (LU).

Example 41 includes the non-transitory computer-readable medium of Example 40, wherein the performance threshold register value corresponds to a shared write buffer endurance threshold, and wherein the notification indicates that an endurance used of the shared write buffer has exceeded the shared write buffer endurance threshold.

According to Example 42, an apparatus includes means for receiving, at a host controller interface (HCI) from a flash memory device, a notification that a performance threshold register value has been exceeded while the flash memory device is configured to use a shared write buffer; and means for performing a remedial action that includes reassigning a portion of a first logical unit (LU), the remedial action performed in response to receiving the notification.

Example 43 includes the apparatus of Example 42, wherein the means for receiving and the means for performing are integrated into at least one of a computer, a communication device, a mobile device, an extended reality (XR) device, a headset, a vehicle, or a camera.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A host device comprising:
a host controller interface (HCI) configured to be coupled to a flash memory device and configured to:
receive a notification from the flash memory device that a performance threshold register value has been exceeded, wherein the flash memory device includes a shared write buffer and is configured to use the shared write buffer as a temporary storage for data writes; and
in response to receiving the notification, perform a remedial action that includes:
reassigning a portion of a first logical unit (LU); and
sending a command to the flash memory device to convert the portion of the first LU from a triple-level cell (TLC) memory type to a single-level cell (SLC) memory type.

2. The host device of claim 1, wherein the reassigning the portion of the first LU includes sending an unmap command to the flash memory device to update a memory mapping table at the flash memory device.

3. The host device of claim 1, wherein the HCI is configured to:
reassign memory of the shared write buffer to a second LU; and
reassign the portion of the first LU for use as the shared write buffer.

4. The host device of claim 3, wherein the HCI is configured to send a command to the flash memory device to flush the shared write buffer prior to reassigning the memory of the shared write buffer to the second LU.

5. The host device of claim 1, wherein the HCI is configured to reassign the portion of the first LU to a second LU of the flash memory device.

6. The host device of claim 1, wherein the performance threshold register value corresponds to a LU capacity threshold, and wherein the notification indicates that a utilization of a second LU of the flash memory device has exceeded the LU capacity threshold.

7. The host device of claim 6, wherein the notification includes an exception event alert.

8. The host device of claim 7, wherein the HCI is configured to send a command to the flash memory device to set an exception event control attribute to activate alert generation corresponding to LU capacity, and wherein the exception event alert is generated in response to a determination that the exception event control attribute indicates that the alert generation is activated and that an exception event status indicates that the utilization of the second LU of the flash memory device has exceeded the LU capacity threshold.

9. The host device of claim 1, wherein the performance threshold register value corresponds to a shared write buffer endurance threshold, and wherein the notification indicates that an endurance used of the shared write buffer has exceeded the shared write buffer endurance threshold.

10. The host device of claim 9, wherein the notification includes an exception event alert.

11. The host device of claim 10, wherein the HCI is configured to send a command to the flash memory device to set an exception event control attribute to activate alert generation corresponding to shared write buffer endurance, and wherein the exception event alert is generated in response to a determination that the exception event control attribute indicates that the alert generation is activated and that an exception event status indicates that the endurance used of the shared write buffer has exceeded the shared write buffer endurance threshold.

12. The host device of claim 9, wherein the HCI is configured to determine the endurance used of the shared write buffer based on a count of program cycles performed at the shared write buffer, a program cycle time of the shared write buffer, or both.

13. The host device of claim 1, wherein the HCI is configured to identify the first LU based on detecting the first LU corresponds to a least utilized LU among a plurality of LUs.

14. The host device of claim 13, wherein the HCI is configured to determine that the first LU corresponds to the least utilized LU based on values of a utilization array.

15. The host device of claim 13, wherein the HCI is configured to determine that the first LU corresponds to the least utilized LU based on determining that the first LU has a largest available storage capacity among the plurality of LUs.

16. The host device of claim 13, wherein the HCI is configured to determine that the first LU corresponds to the least utilized LU based on a count of write commands to the first LU, a program cycle count of the first LU, a program cycle time of the first LU, an available storage capacity of the first LU, or a combination thereof.

17. A method comprising:
receiving, at a host controller interface (HCI) from a flash memory device, a notification that a performance threshold register value has been exceeded, wherein the flash memory device includes a shared write buffer and is configured to use the shared write buffer as a temporary storage for data writes; and
in response to receiving the notification, performing a remedial action that includes:
reassigning a portion of a first logical unit (LU); and
sending a command to the flash memory device to convert the portion of the first LU from a triple-level cell (TLC) memory type to a single-level cell (SLC) memory type.

18. The method of claim 17, wherein the reassigning the portion of the first LU includes sending an unmap command to the flash memory device to update a memory mapping table at the flash memory device.

19. The method of claim 17, further comprising reassigning memory of the shared write buffer to a second LU, wherein the portion of the first LU is reassigned for use as the shared write buffer.

20. The method of claim 19, further comprising sending a command to the flash memory device to flush the shared write buffer prior to reassigning the memory of the shared write buffer to the second LU.

21. The method of claim 17, wherein the portion of the first LU is reassigned to a second LU of the flash memory device.

22. The method of claim 17, wherein the performance threshold register value corresponds to a LU capacity threshold, and wherein the notification indicates that a utilization of a second LU of the flash memory device has exceeded the LU capacity threshold.

23. A non-transitory computer-readable medium configured to store instructions that, when executed by one or more processors, cause the one or more processors to:
receive, at a host controller interface (HCI) from a flash memory device, a notification that a performance threshold register value has been exceeded, wherein the flash memory device includes a shared write buffer and is configured to use the shared write buffer as a temporary storage for data writes; and
in response to receiving the notification, perform a remedial action that includes;
reassigning a portion of a first logical unit (LU); and
sending a command to the flash memory device to convert the portion of the first LU from a triple-level cell (TLC) memory type to a single-level cell (SLC) memory type.

24. The non-transitory computer-readable medium of claim 23, wherein the performance threshold register value corresponds to a shared write buffer endurance threshold, and wherein the notification indicates that an endurance used of the shared write buffer has exceeded the shared write buffer endurance threshold.

25. An apparatus comprising:
means for receiving, at a host controller interface (HCI) from a flash memory device, a notification that a performance threshold register value has been exceeded, wherein the flash memory device includes a shared write buffer and is configured to use the shared write buffer as a temporary storage for data writes; and
means for performing a remedial action that includes reassigning a portion of a first logical unit (LU) and sending a command to the flash memory device to convert the portion of the first LU from a triple-level cell (TLC) memory type to a single-level cell (SLC) memory type, the remedial action performed in response to receiving the notification.

26. The apparatus of claim 25, wherein the means for receiving and the means for performing are integrated into at least one of a computer, a communication device, a mobile device, an extended reality (XR) device, a headset, a vehicle, or a camera.

* * * * *